United States Patent [19]

Misra et al.

[11] Patent Number: 4,991,721

[45] Date of Patent: Feb. 12, 1991

[54] AUTOMATION OF AN AIR-SCREEN SEED CLEANER

[75] Inventors: Manjit K. Misra; Yuh-Yuan Shyy, both of Ames, Iowa

[73] Assignee: Iowa State University Research Foundation, Inc., Ames, Iowa

[21] Appl. No.: 231,946

[22] Filed: Aug. 15, 1988

[51] Int. Cl.[5] .......... B07B 9/00; B07B 4/02; G05B 13/02

[52] U.S. Cl. .......... 209/31; 209/37; 209/139.001; 209/257; 209/546; 209/557; 364/502; 364/552

[58] Field of Search .......... 209/21, 30–37, 209/44.1, 44.2, 134–139.1, 146, 147, 149, 153, 154, 237, 238, 255, 257, 546, 549, 552, 555, 557, 629, 639; 55/215, 218, 270, 279, 413, 423–426; 364/500, 502, 552, 555; 406/28, 168, 169, 173

[56] References Cited

U.S. PATENT DOCUMENTS

| | | | |
|---|---|---|---|
| 289,316 | 11/1883 | Smith | 406/169 |
| 696,870 | 4/1902 | Kessler | 209/37 |
| 996,155 | 6/1911 | Spenst | 209/37 |
| 2,070,530 | 2/1937 | Gallagher et al. | 209/257 |
| 2,762,506 | 9/1956 | Fine | 209/139.1 X |
| 2,973,861 | 3/1961 | Jager | 209/1 |
| 3,079,079 | 2/1963 | Phister, Jr. et al. | 364/502 |
| 3,494,217 | 2/1970 | Tanaka et al. | 209/1 X |
| 3,551,897 | 12/1970 | Cooper | 364/502 X |
| 3,606,745 | 9/1971 | Girodat | 209/1 X |
| 4,149,415 | 4/1979 | Harbour | 73/865.5 |
| 4,252,071 | 6/1980 | Horowitz et al. | 366/152 |
| 4,318,806 | 3/1982 | Satake | 209/496 |
| 4,321,134 | 3/1982 | Leschonski et al. | 209/30 |
| 4,330,400 | 5/1982 | Schmidt | 209/34 X |
| 4,490,247 | 12/1984 | Forsberg et al. | 209/20 |
| 4,588,091 | 5/1986 | Wade | 209/546 |
| 4,634,522 | 1/1987 | Edholm et al. | 209/154 |
| 4,657,144 | 4/1987 | Martin et al. | 209/546 |
| 4,658,964 | 4/1987 | Williams | 209/552 |
| 4,687,105 | 8/1987 | Edholm et al. | 209/546 |

FOREIGN PATENT DOCUMENTS

| | | | |
|---|---|---|---|
| 0150559 | 9/1981 | Fed. Rep. of Germany | 209/257 |
| 2605252 | 4/1988 | France | 209/237 |
| 0268881 | 8/1970 | U.S.S.R. | 209/1 |
| 0618131 | 6/1978 | U.S.S.R. | 209/1 |
| 0667258 | 6/1979 | U.S.S.R. | 209/552 |
| 1125069 | 11/1984 | U.S.S.R. | 209/237 |

OTHER PUBLICATIONS

"Profitability Through Computerized Conditioning", Misra et al., Eighth Annual Seed Technology Conference, Feb. 25–26, 1986.

*Primary Examiner*—Margaret A. Focarino
*Assistant Examiner*—Edward M. Wacyra
*Attorney, Agent, or Firm*—Zarley, McKee, Thomte, Voorhees & Sease

[57] ABSTRACT

A cleaning system is provided for separating desired material from undesirable material in a mixture of particulate materials. The system includes an inlet for receiving the mixture of materials and an outlet for discharging the desired materials. At least one screen is provided for separating undersized material from oversized material within the mixture, and at least one vacuum air-lift is provided for separating the lighter material from the heavier material within the mixture. A first sensor is mounted below the discharge end of the screen for sensing the quantity of undersized material separated by the screen and a second sensor is mounted in the air-lift for sensing the quantity of lighter materials separated by the air-lift. The signals generated by the sensors can be received by a processing unit which adjusts the extent of separation by the screen and by the air-lift to achieve the desired efficiency of the cleaning system.

16 Claims, 23 Drawing Sheets

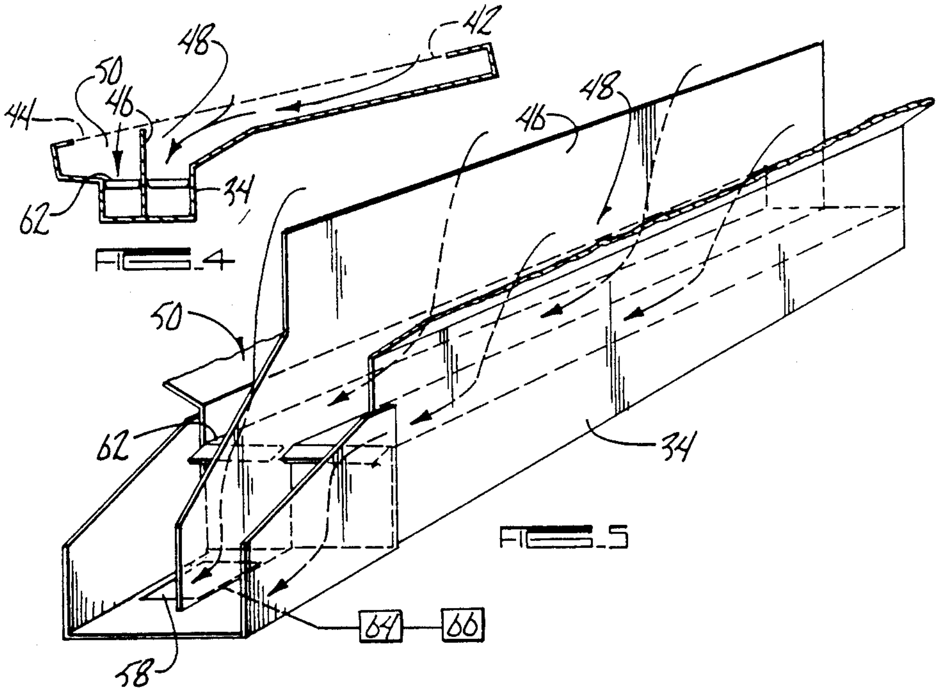
FIG_4
FIG_5
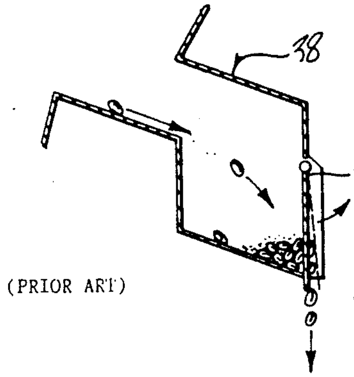
FIG_6
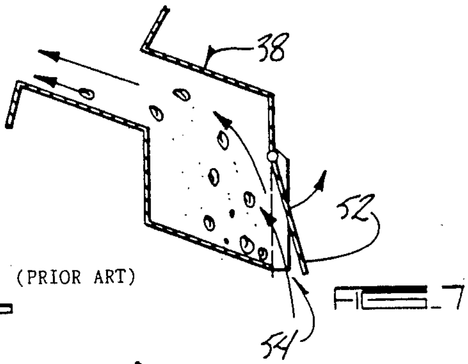
FIG_7
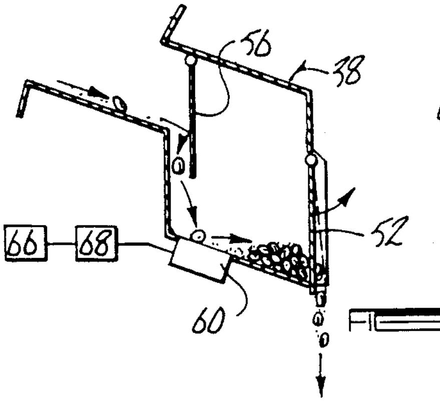
FIG_8
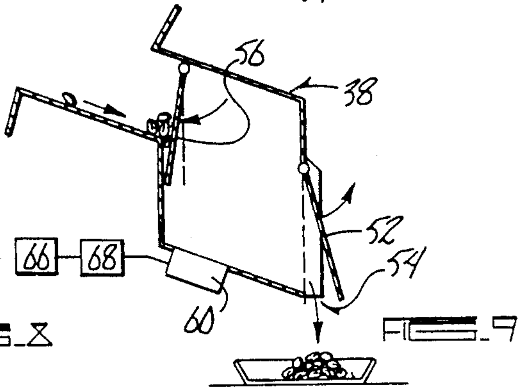
FIG_9

| PORT B VALUE(#$) | FUNCTION | POWER LINE (OUTSIDE) | NOTE |
|---|---|---|---|
| 6Ø | DISABLE | | 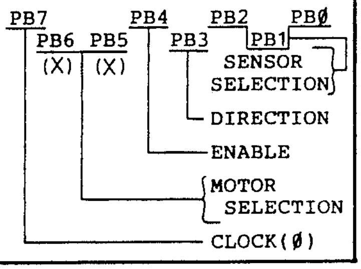 |
| 4Ø<br>48 | M#1 CCW(DECREASE LOWER AIR)<br>M#1 CW(INCREASE LOWER AIR) | >+12V DC | |
| 2Ø<br>28 | M#2CCW(DECREASE UPPER AIR)<br>M#2 CW(INCREASE UPPER AIR) | >+12V DC | |
| ØØ<br>Ø8 | M#3CCW(INCREASE FEED RATE)<br>M#3 CW(DECREASE FEED RATE) | >+12V DC | |
FIG. 17A
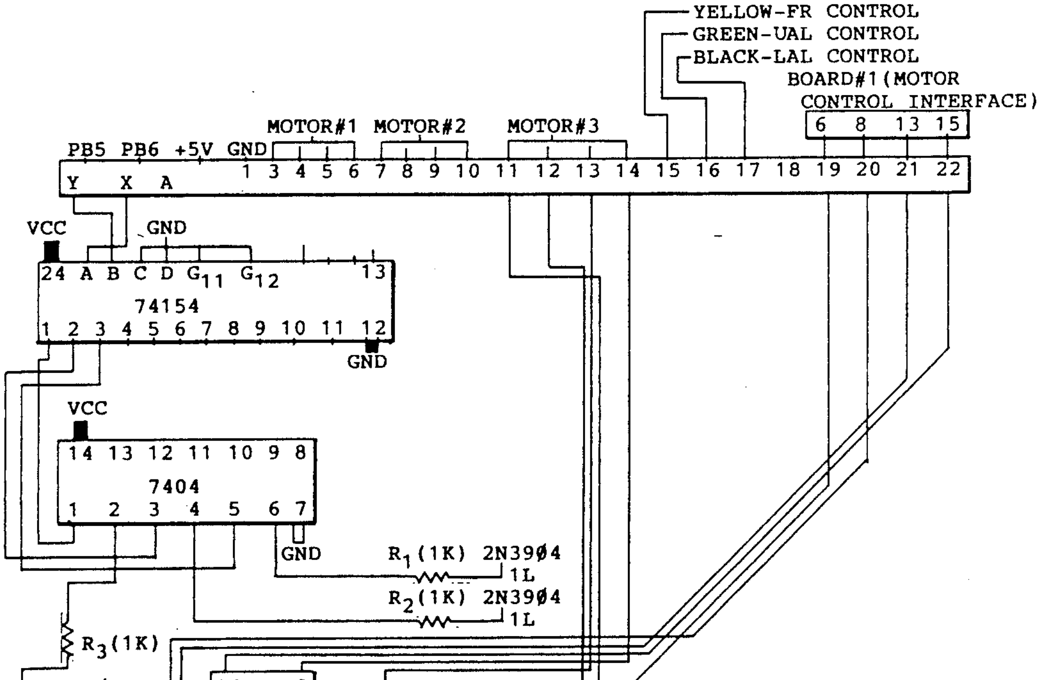
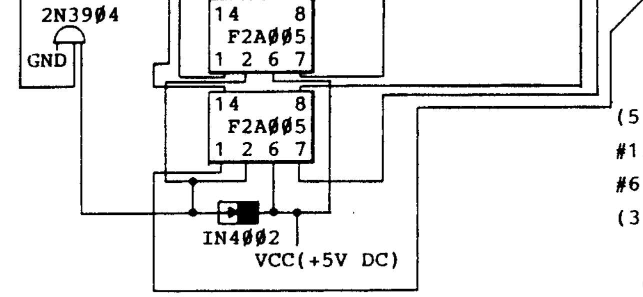
FIG. 17B
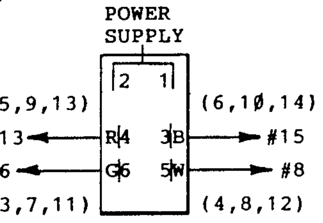
STEPPING MOTOR CONNECTOR (6-PIN)
FIG. 17C C: PROGRAM PRESET PARAMETERS ARE USED.
D: PARAMETERS GIVEN BY OPERATOR ARE USED.
E: PARAMETERS GIVEN BY AUTOMATIC READING PROGRAM ARE USED.

AUTOMATION OF AN AIR-SCREEN SEED CLEANER

BACKGROUND OF THE INVENTION

In seed cleaning operations, the quality of the final seed mixture is an important factor. Conventional seed cleaning systems utilize screens and air to remove foreign matter and other undesirable materials from the desired seeds. Typically, two air separation stages are provided for lifting and removing lightweight materials. The first air-lift is located at the seed hopper and draws a strong stream of air through the entire bulk of seed as it feeds into the cleaning machine. This initial air-lift removes most of the light trashy material from the seed bulk. A second air-lift is normally located adjacent the outlet of the cleaning machine where the cleaned seeds are discharged. This second air-lift removes any remaining light off-grade seeds, hollow kernels, or broken seeds which are not sifted by the screens. The terminal velocity of the seed is an important operating criterion, and proper adjustment of the air-lift is crucial for efficient separation and cleaning Typically, at least two screens are also utilized for cleaning the seed. The first or top screen removes coarse foreign material which is larger than the seed, while allowing the seed, dirt, and other small particles to pass through onto the finer second or bottom screen. This second screen retains the clean seed on top, while allowing the foreign material which is smaller than the seed to pass through. The feed rate along the screens must be properly adjusted to obtain maximum and efficient performance.

In these conventional seed cleaning machines, the adjustments of the air-lift vacuum and the screen feed rate are accomplished manually by visual inspection and trial and error. Frequent supervision and adjustment by the operator is necessary to maintain the seed quality with minimum seed loss. Also, such manual adjustments are made at spaced timed intervals, and therefore necessarily attempt to correct problems which have already allowed foreign matter to remain in the finished seed product and/or allowed good seed to be removed with the waste by the screens and air-lift.

Therefore, a primary objective of the present invention is the provision of an improved seed cleaning system which allows for maximization of cleaning efficiency.

Another objective of the present invention is the provision of an improved seed cleaning system which is continuously monitored and adjusted for controlling the efficiency of the operation.

A further objective of the present invention is the provision of a seed cleaning system having an improved airlift spout.

Yet another objective of the present invention is the provision of a seed cleaning system having an improved screening spout.

Still another objective of the present invention is the provision of a seed cleaning system having a computer processing unit for monitoring and adjusting the seed cleaning operation, if desired.

These and other objectives will become apparent from the following description of the present invention.

SUMMARY OF THE INVENTION

The present invention improves upon conventional seed cleaning machines having dual screens and dual air-lifts for cleaning the seed. The improved system includes a computerized processing unit for continuously monitoring the material removed from the seed mixture by the screens and air-lifts and for continuously adjusting the air-lift vacuum and the screen feed rate so as to achieve the desired cleaning efficiency.

The present invention further improves the conventional cleaning system by providing an improved air-lift spout having an inner gate and a standard outer gate for the upper and lower air-lifts. The inner gate is normally open during operation of the system, but will automatically close to maintain the air-lift vacuum when the outer gate is opened to retrieve a sample from the air-lift spout.

The present invention also improves upon the conventional cleaning system by providing an improved screening spout having a divider plate therein adjacent the downstream end of the final screen. The divider plate divides the screening spout into an upstream side and a downstream side, such that the upstream side collects the undersized materials sifted along the substantial length of the final screen, while the downstream side collects the undersized materials sifted immediately adjacent the discharge end of the screen. The presence of any material in the downstream side of the spout indicates that separation along the screen has been incomplete. Accordingly, a single sensor positioned in the downstream side of the screening spout is sufficient for monitoring the screen's operation. Additional sensors along the length of the screen can therefore be eliminated.

The screening sensor produces a signal corresponding to the quantity of undersized material passing through the screen at the discharge end thereof. Similarly, a sensor in the air-lift spout produces a signal corresponding to the quantity of lighter material separated by the air-lift. The sensors are operatively connected to the computerized processing unit which continuously receives and processes the respective signals for monitoring the cleaning operation and for adjusting the extent of separation by the screen and air-lift to achieve a desired efficiency for this system.

BRIEF DESCRIPTION OF THE DRAWINGS

FIG. 4 is a schematic side elevational view of the improved screening spout of the present invention.

FIG. 5 is a perspective view of the improved screening spout of the present invention.

FIG. 6 is a schematic of a conventional air-lift spout in a closed position.

FIG. 7 is a schematic view of a conventional air-lift spout in an opened position.

FIG. 8 is a schematic view of the improved air-lift spout of the present invention in a closed position.

FIG. 9 is a schematic view of the improved air-lift spout of the present invention in an open position.

FIGS. 19A, 19B and 19C are schematic tables and representations of an embodiment and function of the stepping motor interface of FIG. 12.

FIG. 32 is a graphic representation of operation of the invention.

DETAILED DESCRIPTION OF THE PREFERRED EMBODIMENT

Figure 1:
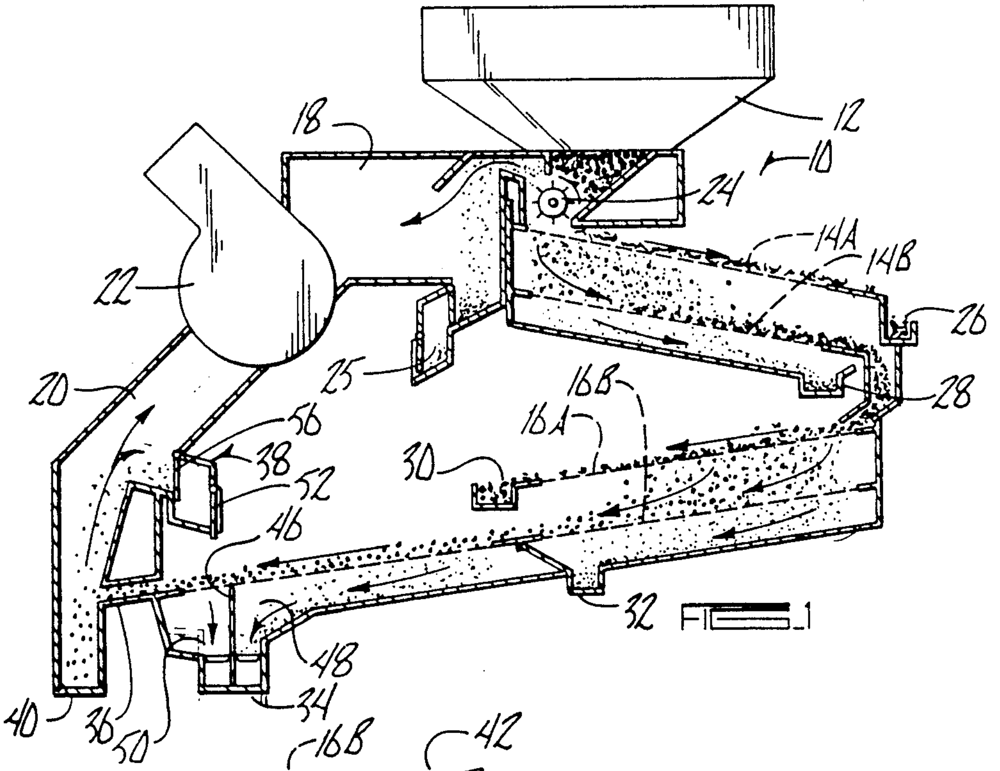
FIG. 1 is a schematic view of a conventional seed cleaning machine.

An air-screening seed cleaner 10 is schematically shown in FIG. 1. Cleaner 10 includes an inlet feed hopper 12, a first set of screens 14A and 14B, a second set of screens 16A and 16B, an upper air-lift 18 and a lower air-lift 20. Air-lifts 18 and 20 are of the vacuum type wherein the vacuum is created by a fan 22 for each air-lift. (Only one fan is shown.) Fans 22 include an adjustable damper 23 for controlling the vacuum created by the fan. The hopper, screens, air-lifts and fans are conventional, and do not form a part of the present invention.

In the operation of a conventional seed cleaner, a mixture of the seed to be cleaned and foreign material is fed into hopper 12 which introduces the mixture onto screen 14A at a fixed rate as determined by a motorized feed wheel 24. As the mixture is fed onto screen 14A, the vacuum in air-lift 18 removes most of the light trashy materials from the mixture, which are collected in a trough or spout 25 for disposal. The oversized rough scalp remains on top of screen 14A while the undersized material, including the desired seeds, passes through screen 14A. A trough or spout 26 at the end of screen 14A collects the rough scalp for disposal. Similarly, screen 14B retains the oversized particles, which includes the desired seed, while the undersized material passes therethrough and is collected in trough or spout 28 for disposal.

As the cleaning operation continues, the desired seed from screen 14B, which still includes a quantity of undesirable foreign matter, passes onto screen 16A. Again, the oversized close scalp is retained on top of screen 16A and collected in a trough or spout 30 for disposal, while the undersized particles, including the desired seed, passes through screen 16A and onto screen 16B. Screen 16B allows fines and splits to pass therethrough which are collected in troughs or spouts 32, 34 for disposal, while the desired clean seeds are retained on top of screen 16B.

At the discharge end 36 of screen 16B, the cleaned seeds are introduced into the lower air-lift 18 wherein lighter materials, such as off-grade seeds, hollow kernals, or broken seeds, which have not been sifted out by the screens are removed and collected in a spout 38 for disposal. Finally, the clean seeds are discharged through an outlet 40 for collection.

Figure 2:
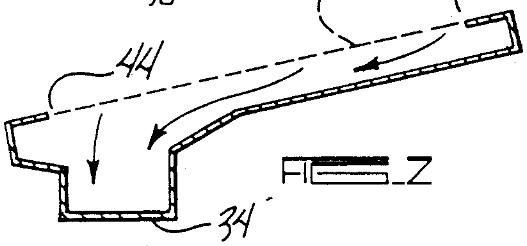
FIG 2 (PRIOR ART)
FIG. 2 is a schematic side elevational view of a conventional screening spout.
Figure 3:
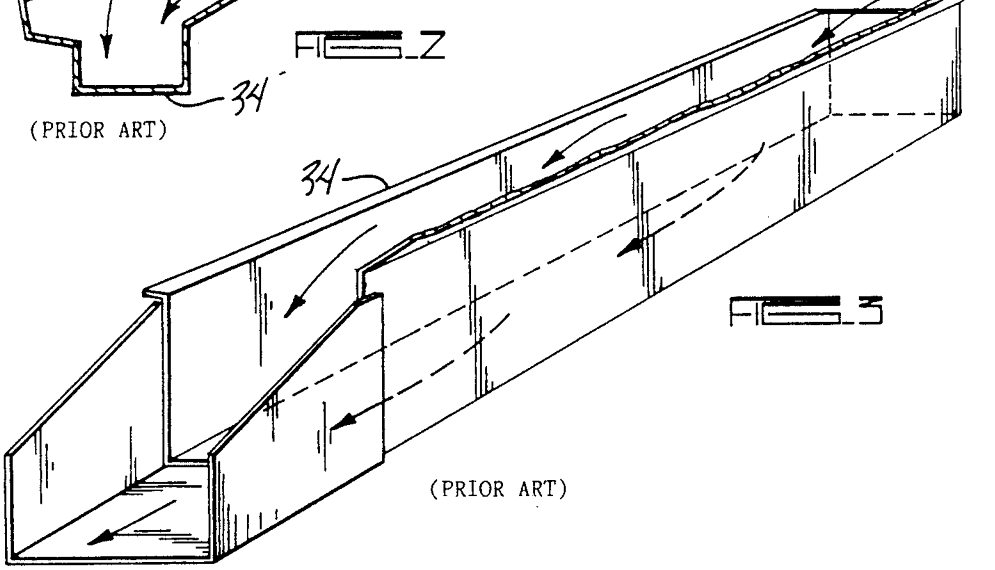
FIG 3 (PRIOR ART)
FIG. 3 is a perspective view of a conventional screening spout.

During the cleaning operation, it is desirable to monitor the screening efficiency from the screening spout 34. A conventional screening spout is shown in FIGS. 2 and 3. With the conventional spout, monitoring is difficult since spout 34 collects the undersized screenings from the feed end 42 to the discharge end 44 of screen 16B, as indicated by the arrows in FIG. 3. To overcome this problem, the present invention provides a new design for the screening spout 34, as shown in FIGS. 4 and 5. More particularly, a divider plate 46 is vertically disposed within spout 34 so as to divide the spout into an upstream side 48 and a downstream side 50. Thus, the upstream side 48 collects the undersized material sifted along the substantial length of screen 16B while the downstream side collects the undersized material sifted immediately adjacent the discharge end 44 of screen 16B. Accordingly, the presence of any sifted material in the downstream side 50 of spout 34 indicates that the separation by the screen of the undersized material from the oversized material is incomplete.

It is also desirable to monitor the air-lift efficiency to be sure that desired seeds are not being lifted for disposal rather than remaining on the screens and ultimately dropping for discharge through outlet 40. Lower air-lift spout 38 is structurally and functionally identical to upper air-lift spout 25, therefore only spout 38 will be described.

FIGS. 6 and 7 show a conventional lower air-lift spout 38. Spout 38 typically includes a pivotally mounted gate 52 which normally is pulled shut due to the vacuum within air-lift 20 and spout 38. As the weight of the liftings deposited in spout 38 increases, the weight will push gate 52 open slightly, thereby allowing the liftings to fall out, as indicated in FIG. 6. This slight opening of gate 52 does not significantly effect the operation of air-lift 20. In order to check the quality of the lower air-liftings within spout 38, in conventional operation, the operator manually opens gate 52 and reaches into spout 38 to grab a handful of liftings However, such opening of gate 52 causes exterior air to be drawn into spout 38 through outlet opening 54 which causes the liftings to be sucked rearwardly away from opening 54, as shown by the arrows in FIG. 7. Furthermore, such opening of gate 52 reduces the vacuum within lower air-lift 20, therefore causing some lightweight materials to fall for discharge through outlet 40.

The present invention provides improved air-lift spouts 25 and 38 having pivotally mounted second interior gates 56, as shown in FIGS. 8 and 9.

In normal operation, as shown in FIG. 8, second gate 56 is normally opened so as to allow the liftings to pass thereby for collection adjacent first gate 52. However, when first gate 52 is opened to retrieve a sample of liftings, the vacuum within air-lift 20 pulls second gate 56 closed, as shown in FIG. 9, so as to prevent exterior air from being drawn into air-lift 20 and so as to maintain the vacuum level within air-lift 20. Thus, the efficiency of the air-lift is not decreased when first gate 52 is opened, as with the conventional spout shown in FIGS. 6 and 7.

As the operation of the screen separation and air-lift separation is monitored, it may be necessary to adjust one or both of these operations so as to achieve the desired cleaning efficiency. Therefore, the present invention provides a first sensor 58 adjacent to downstream side 50 of screen 16B, seen in FIGS. 4 and 5, and a second sensor 60 below second gate 56 of air-lift spout 38, as seen in FIGS. 8 and 9.

Sensor 58 senses the quantity of undersized material received in downstream side 50 of spout 34. Spout 34 includes a plate 62 which allows for gravity flow of the lightweight material onto sensor 58. Sensor 58 produces a signal corresponding to the quantity of lightweight material impacting thereon. An interface 64 receives the signal from sensor 58 and forwards it to a processing unit 66 which then adjusts the screening operation to achieve the desired efficiency of the system, as described hereinafter. More particularly, the processing unit 66 can automatically adjust the rotation speed of feed wheel 24 so that the feed rate of the mixture onto screen 14A is controlled to allow more or less screening separation to be accomplished along screens 14A, 14B, 16A and 16B.

Similarly, sensor 60 in air-lift spout 38 produces a signal corresponding to the quantity of lighter material sensed thereby. An interface 68 receives the signal from sensor 60 and forwards it to the processing unit 66, which then automatically pivots damper 23 within the respective fan 22 so as to adjust the air-lift vacuum to produce more or less separation as necessary to achieve the desired cleaning efficiency.

While sensors 58 and 60 are shown to be an impact sensor, it is understood that other types of sensors can be utilized, such as photo-electric sensors.

FIGS. 10–32 are specifically directed to a preferred embodiment of the invention which utilizes sensors to monitor the seed cleaning process, and computer(s) to gather, compile, and interpret what is detected at the sensors. By merging the sensors and computer control with the previously described advances in the structure of the seed cleaning mechanism, improvement over the art is achieved. Materials of a variety of size, shape, and weight can be sorted efficiently, economically, and accurately.

In the preferred embodiment, sensor monitoring and computer processing allows at least three modes of operation for the invention. As will be discussed in more detail, the invention can merely monitor the operation of the separation of the material, and display the results for the operator, or record and store results over a selected period of time. Secondly, in a semi-automatic mode, the embodiment of the invention can monitor and display separation operation, and inform the operator what changes are desirable to reach the preferred level of separation efficiency. Third, the present invention can be configured to operate autonomously. In this mode, the controlling computer would alter the operation of the separator automatically, to maintain a predesired separation efficiency or operation.

It is to be understood that the following is a description of a preferred embodiment only, and that many different configurations of the invention are possible.

Figure 10:
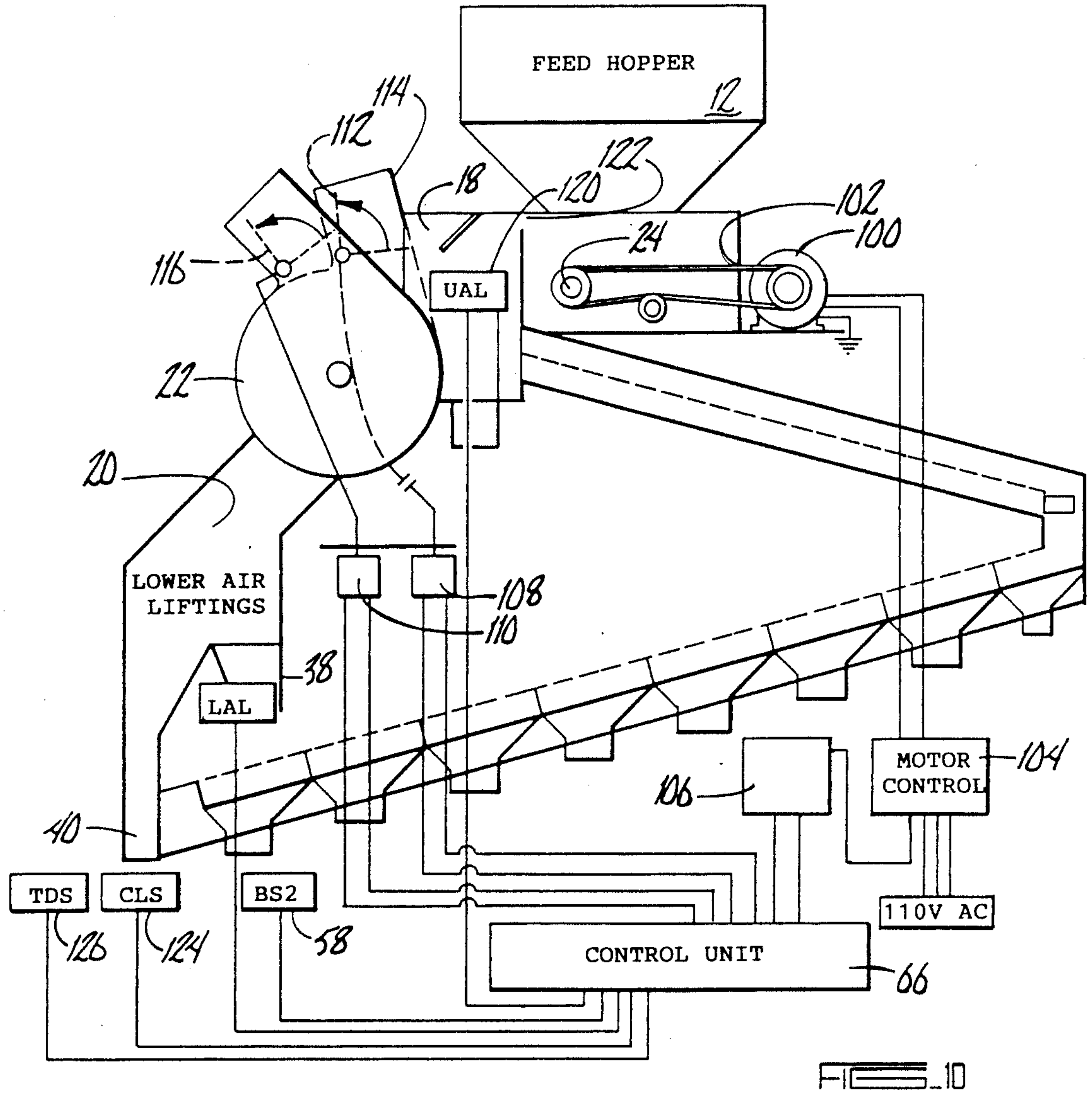
FIG. 10 is a schematic representation of the seed cleaning machine of FIG. 1 with sensors, motors, and control units for automating the seed cleaning machine.
Figure 11A:
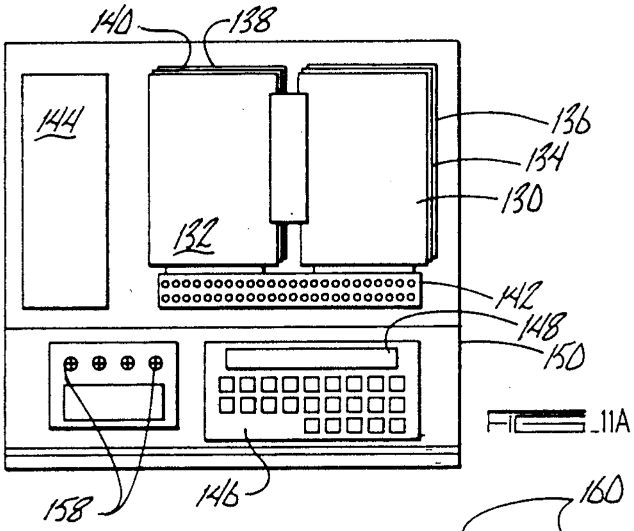
FIGS. 11A, 11B, and 11C are top, front, and back schematic views, respectively, of one embodiment of a control unit for the embodiment of FIG. 10.
Figure 11B:
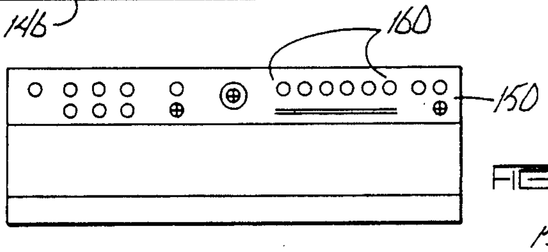
Figure 11C:
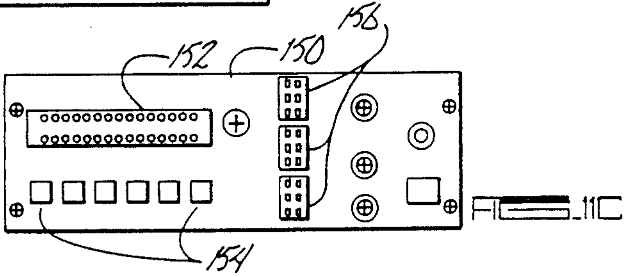

FIG. 10 shows a specific preferred embodiment of the invention with monitors or sensors and computer control. Separation hardware is generally the same as is shown in FIG. 1, and like reference numerals refer to like parts.

FIG. 10 shows motor 100 attached to belt 12 which rotates feed wheel 24. Motor 100 controls the speed of feed wheel 24, which in turn determines the rate at which the material is introduced to the separator. The speed of motor 100 is controlled by motor control 104 such as is known in the art, and which is connected to a 110 volt alternating current source.

A stepper motor 106 is connected to motor control 104 and serves to adjust motor control 104 to in turn adjust speed of motor 100. Stepper motor 106 is in turn controlled by processor or control unit 66.

In the preferred embodiment, motor 100 can be any electrical rotary motor. Stepper motor 106 can be obtained from Japanese Products Corporation, 7 West Chester Plaza, Elmsford, N.Y. 10523 under product designation KP8M2-003 stepping motor, and should have 1.5° per step with 0.41 Nm (58 oz in) dynamic torque.

FIG. 10 also shows two additional stepper motors 108 and 110 which are directly connected and controlled by processor or control unit 66. Stepper motor 108 is operatively connected to damper 112 of upper air fan 114. Stepper motor 110 is operatively connected to damper 112 of lower air fan 22. By connective means such as are known in the art (and not shown) stepper motors 108 and 110 can adjust dampers 112 and 116 in the exhaust of upper and lower fans 114 and 22, to in turn adjust the vacuum created by those fans. Thus, by controlling dampers 112 and 116, the amount of suction or vacuum in upper and lower air lifts 18 and 20 can be controlled.

Stepper motors 108 and 110 can also be obtained from Japanese Products Corporation, under product designation number KP6M2-003 stepping motors. In the preferred embodiment, they would be bigger than stepping motor 106 and would have 0.99 Nm (140 oz in) dynamic torque for controlling the opening of dampers 112 and 116.

It can therefore be seen that each of stepper motors 106, 108 and 110 can control parameters in the separation process which will affect the efficiency of separation.

FIG. 10 also shows that a plurality of sensors can be positioned at certain locations in the separator and transmit signals to control unit 66 so that the efficiency of separation can be monitored. FIG. 10 shows that upper air lift sensor 120 can be positioned in the path of air liftings which are pulled through opening 122 into upper air lift chamber 18 by the vacuum from upper air fan 114. The impacting of air liftings upon upper air lift sensor 120 causes a signal proportionate to the amount of impacting to be generated and sent to control unit 66. By monitoring upper air lift sensor 120 over a period of time, the quantity of upper air liftings being pulled from the material can be derived.

Sensor 58 is positioned so as to monitor the amount of bottom screen materials which are separated from the desired portion of the material. It functions as previously described with respect to FIGS. 4 and 5. By producing a signal proportionate to the amount of screened material impacting upon it, bottom screen sensor 58 sends a signal to control unit 66 which can be used to derive information about the efficiency of separation.

Sensor 60, which will be referred to as lower air lift sensor 60, is positioned within spout 38 for lower air liftings. It operates as described with respect to FIGS. 8 and 9 above, and just as with upper air lift sensor 120, produces a signal proportionate to the amount of air liftings which impact upon it and sends those signals to control unit 66.

In the preferred embodiment of FIG. 10, a clean seed sensor 124 can be positioned directly under outlet 40. It produces a signal proportionate to the amount of clean seed which impacts upon it, and sends that signal to control unit 66. It is also to be understood that a total discard seed sensor 126 can also be utilized to produce a signal proportionate to the total discarded seeds which impact upon it.

Each of the sensors can be what are called impact sensors. Alternatively they can be photo-electric detectors. In the preferred embodiment, the bottom screen sensor 58, lower air lifting sensor 60, and upper air lifting lift sensor 120 are grain loss sensors available from Dickey-john Corporation under the product designation Shoe Sensor, Part No. 10822-0013. The clean seed sensor in the preferred embodiment is also a grain loss sensor from Dickey-john Corporation under the product designation Walker Sensor, Part No. 15491-0001. All sensors can be ordered from Dickey-john Service Center, 6212 East 14th Street, Des Moines, Iowa, or P. 0. Box 10, Auburn, Ill. 62615.

It therefore can be seen from FIG. 10, that control unit 66 obtains monitoring information from sensors 58, 60, 120, 124 (and possibly 126). By comparing those signals to predetermined ranges, control unit 66 can issue instructions to stepper motors 106, 108, or 110 to selectively alter feed rate, upper air lift, or lower air lift, according to desire and according to keeping the separation process within the pre-set ranges. Thus, the system can automatically adjust to achieve maximum efficiency of separation.

A preferred embodiment of control unit 66 will now be described. By referring to FIGS. 11A, B and C, control unit 66 includes circuit boards (reference numerals 130, 132, 134, 136, 138 and 140) all of which plug into a common bus 142, and are in electrical connection with a power supply 144, a keyboard 146, and a display 148. All of these elements are contained within a cabinet 150 which includes appropriate power supply plug-ins and communication line plug-ins for attachment of control unit 66 to the sensors, the motors, and other processing equipment, if desired. For example, a 30-pin jack 152 can serve to be connected to a digital communications bus so that data can be sent to other processing equipment (see FIG. 11C). Appropriate sensor jacks 154 receive cables from the sensors utilized in the system. Motor jacks 156 receive plugs from communication cable to stepper motors 106, 108, and 110. Additionally, plugs exist for 5 VDC, 12 VDC, ground (DC) and 110 VAC (see FIG. 11C).

Control unit 66 can also contain miscellaneous control switches or buttons. For example, auto control buttons 158 can be used to select pre-set auto control ranges (see FIG. 11A). Additionally, sensor buttons 160 (see FIG. 11B) can be utilized to bring up on display 148 the instantaneous value for any of the sensors of the system. Other control buttons and features can be incorporated into control unit 66 as are desired.

Figure 12:
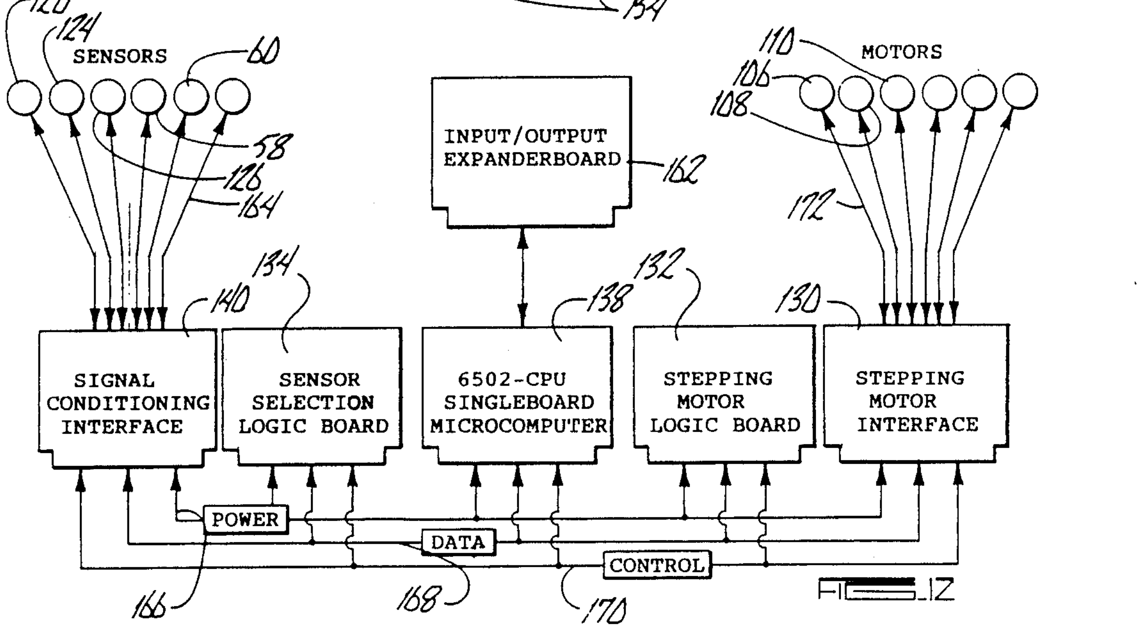
FIG. 12 is a schematic representation of the electrical connection of the sensors and motors to the circuitry of the control unit of the embodiment of FIG. 10.

FIG. 12 schematically depicts the relationship of circuit boards 130, 132, 134, 136, 138 and 140. Board 138 comprises a single board micro-computer, which in the preferred embodiment is a 6502-CPU or 6502A-CPU. The 6502A-Micro-Processor (board 138) contains 72 lines of input/output (I/O), 4K bytes of RAM, 20K bytes of ROM/EPROM, five timers and two levels of interrupt compressed onto one 11.5 centimeter by 16.5 centimeter standard plug board. The 72 lines of user I/O are configured in logical groups to three edge connectors. Two of the connectors are used for the keyboard/display (reference numerals 146 and 148) and for printer modules. The third connector can be used for other purposes.

Keyboard 146 includes 23 keys, some of alphanumeric nature, and some of multiple function nature. Display 148 consists of a 14-segment fluorescent character display. An on-board 8035 micro-processor (not shown) is also utilized to control display 148, and to interface with CPU 138.

In the preferred embodiment, a Model-6571 input-/output expander board 162 is connectable via RS-232C ports to CPU 138, and in turn can be connected to a 20-character, 120 LPM thermal printer (Olivetti PU-1800 Printer) which is not shown.

FIG. 12 shows that signal conditioning interface board 140 receives electrical signals generated by sensors 120, 124, 126, 58 and 60 over separate communication channels 164. Signal conditioning interface 140 is also contained on a standard plug board and is connected to power bus 166, data bus 168, and control bus 170; all of which are interconnected for communication between boards 130, 132, 134, 138 and 140.

Sensor selection logic board 134 contains the necessary circuitry to choose the particular sensor or sensors, for a certain time period, and relay that data to CPU 138.

Stepping motor driver interface board 130 is connected over six channels 172 to various stepper motors. In the preferred embodiment, only three channels 172 are used, namely, for stepper motors 106, 108 and 110. Stepping motor selection logic board 132 then functions with CPU 138 to select which stepping motor will be driven according to the instructions of CPU 138.

Therefore, FIG. 12 shows that processor 66 contains the necessary components to receive the monitoring signals from the sensors, and control operation of the stepping motors according to preset ranges or parameters which are introduced to CPU 138. Processor 66 can also send monitoring information to a printer, or to other processing components, such as a micro-computer, or main frame computer.

Figure 13:
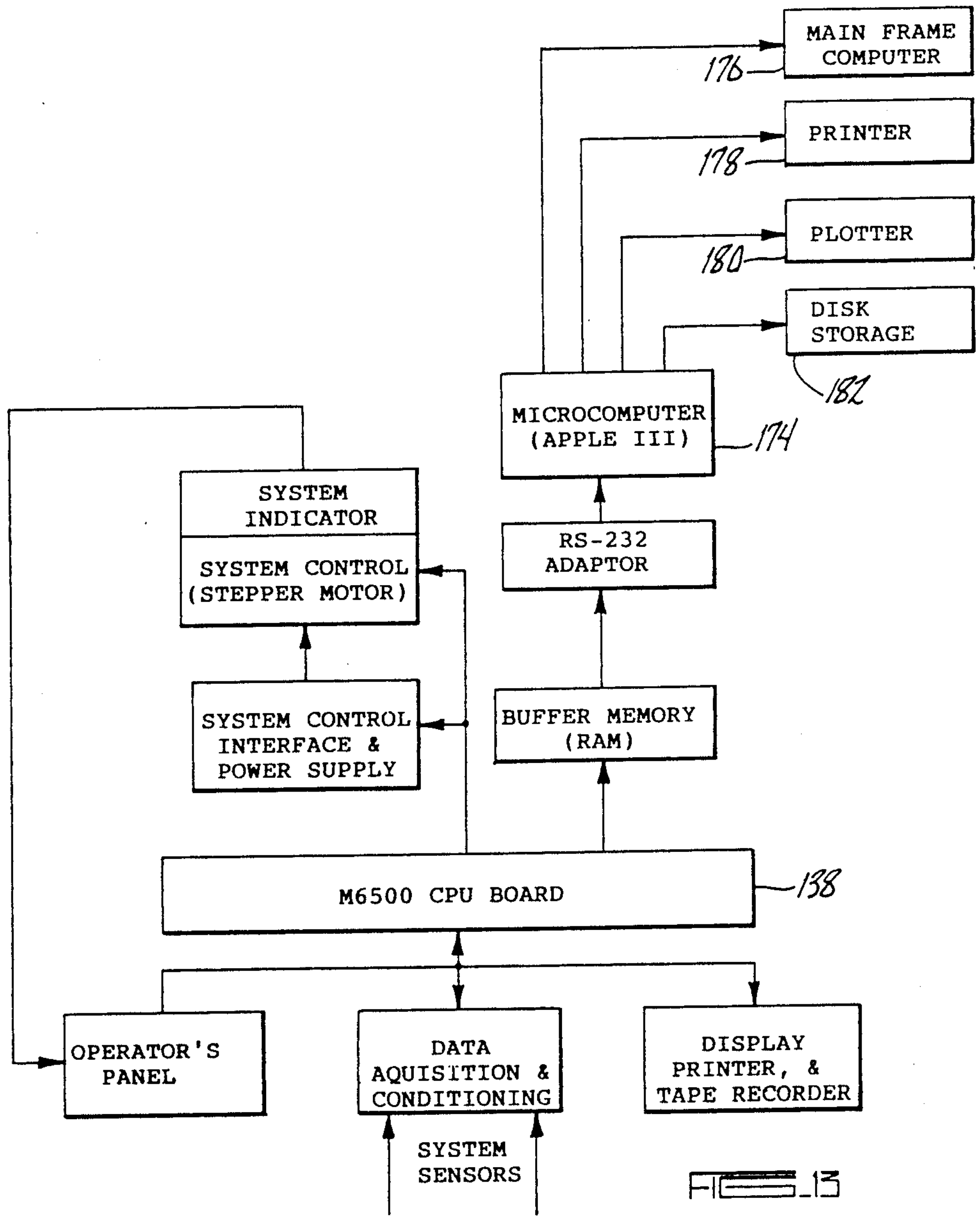
FIG. 13 is a block diagram of the inner connection of various elements of one embodiment of a control unit for the system depicted in FIG. 10.

FIG. 13 depicts in schematic form, one embodiment of the control and processing components for a separator control system according to the present invention. Again, it can be seen that CPU 138 is the center of the system. FIG. 13 additionally utilizes micro-computer 174 (an Apple III computer) which in turn interfaces with main frame computer 176, printer 178, plotter 180, and disc storage 182. It can therefore be seen that the processing capability of the present invention can expand beyond processor 66. Such additional processing can be utilized to preserve a large quantity of data from the separation process, and allow close and complete analysis of operation of the system.

Figure 14B:
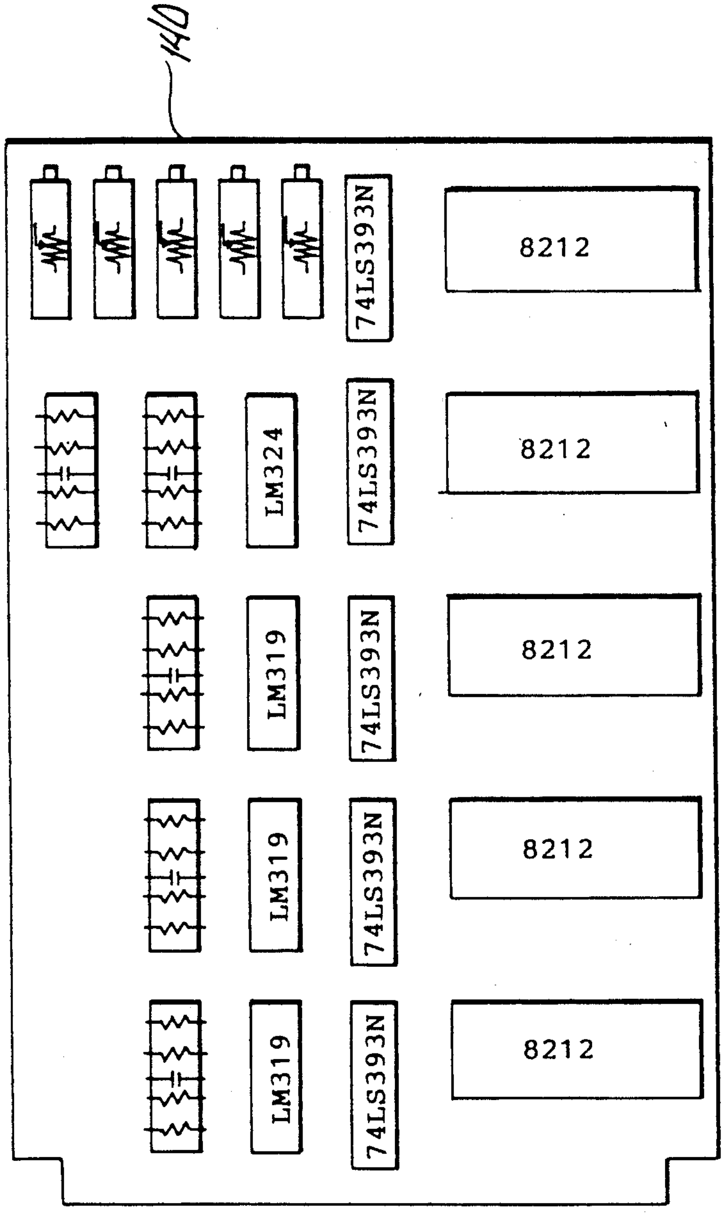
FIGS. 14A and 14B depict schematic representations of the signal conditioning interface or board of FIG. 12.
Figure 14A:
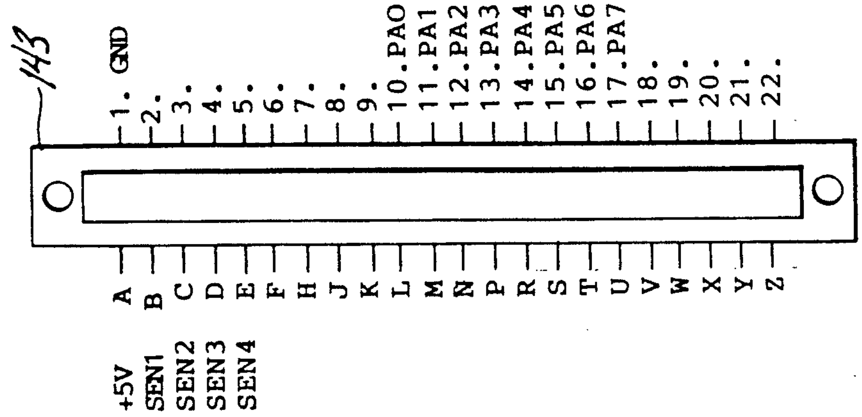

Specifics regarding boards 130, 132, 134, 138 and 140 of processor 66 will now be described. FIG. 14 schematically depicts the components which would be associated with the signal conditioning interface board 140. As can be seen, ports B,C,D and E receive signals from four sensors (sensors 58, 60, 120, and 124). A +5 volts and ground are supplied through ports "A" and "1", respectively. Board 140 essentially contains components for four or five incoming channels from the sensors, the channels are processed through variable resistors 184, capacitor resistor sub-circuits 186, LM319 components, LM324 operational amplifier, 74LS393N counters, and finally 8212 IC buffered latches. These components receive the sensor signals and condition them to prepare them for reliable and accurate presentation to CPU 138.

Figure 15B:
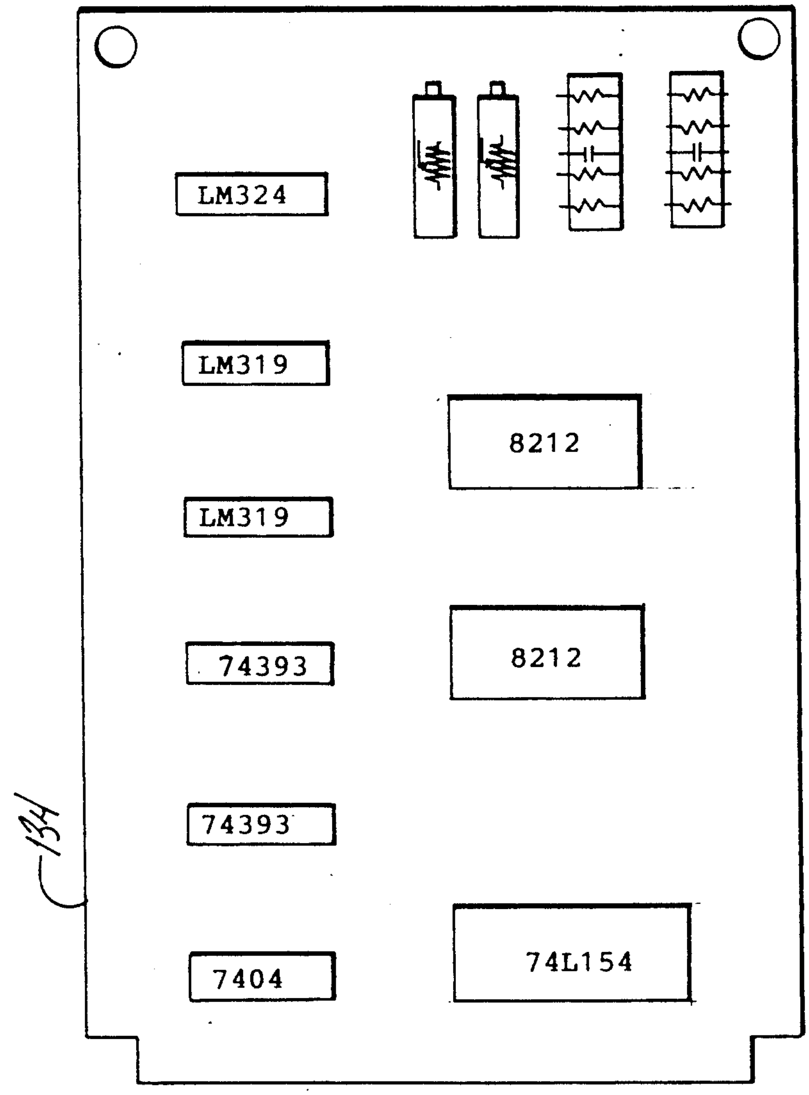
FIGS. 15A and 15B are schematic representations of one embodiment of sensor selection logic board or sensor logic board of FIG. 12.
Figure 15A:
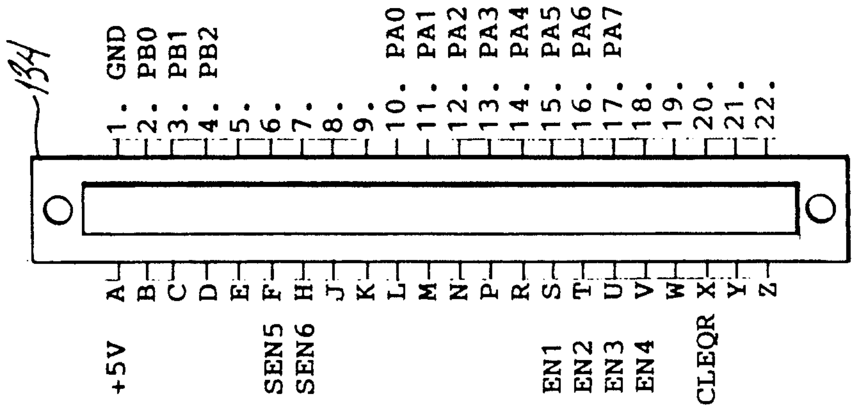

FIGS. 15A and B show schematically the components associated with sensor selection logic board 134. Board 134 includes a 74L154 decoder and 7404 converter. Again, the board is powered by +5 volts DC.

Figure 16:
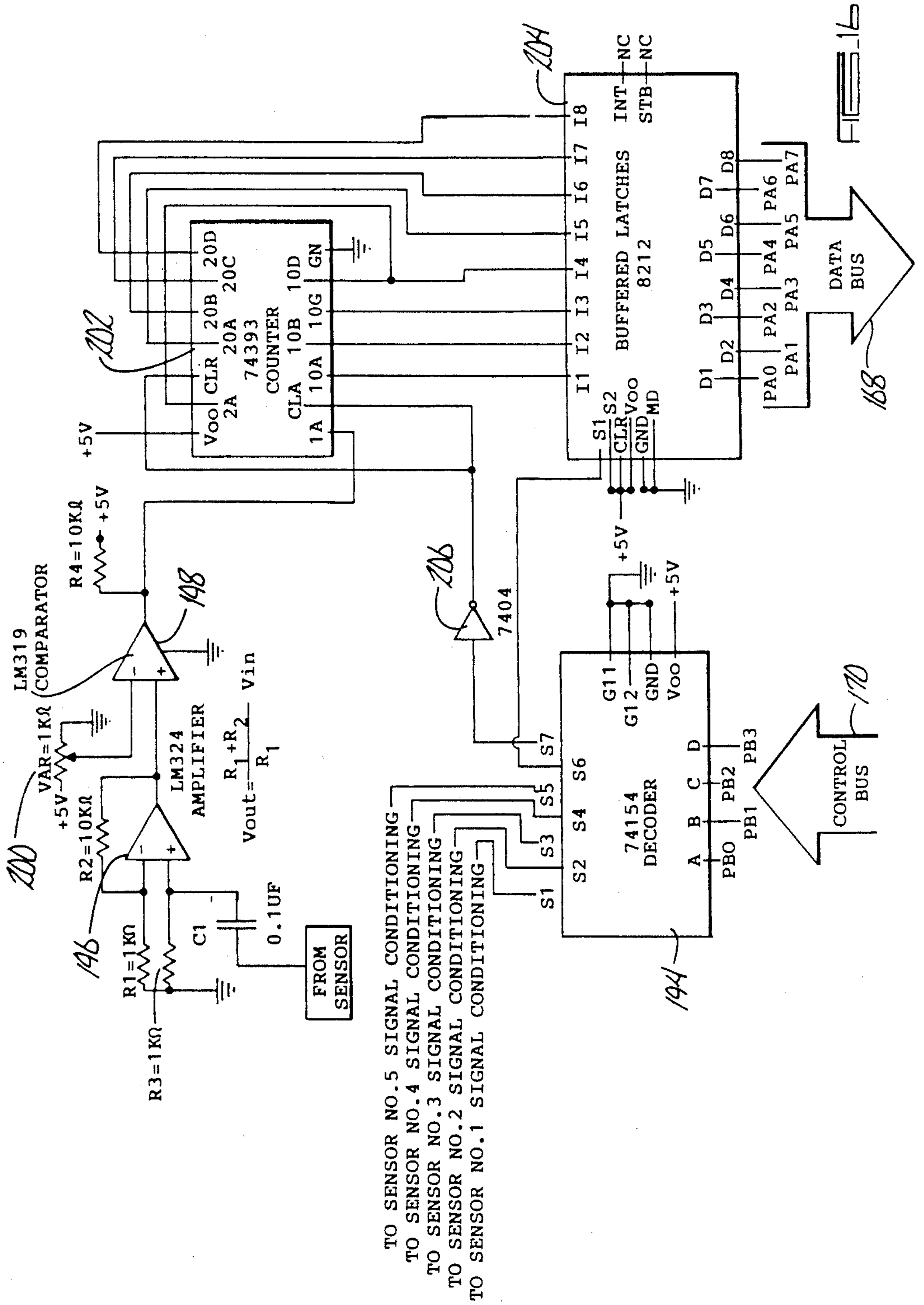
FIG. 16 is an electrical schematic of an embodiment for the sensor logic board of FIGS. 15A and 15B.

FIG. 16 consists of an electrical schematic which sets forth the combined operation of boards 134 and 140. It is to be understood that FIG. 16 is representative of how processor 66 can select a signal from one of the sensors and forward that data to CPU 138. Similar circuitry is utilized for all sensors. FIG. 16 shows three outputs from port B (PB0, PB1, and PB2) are connected to decoder 194 (identified by number 74L154). to allow processor 66 to address eight outputs from the computer program driving processor 66.

FIG. 16 illustrates how the input from a sensor passes through a 0.1 microfarad capacitor to filter out undesirable +5 VDC, which is present in the output of the sensor when there is no load. The sensor signal is then fed to a LM324 operational amplifier (reference numeral 196) which presents a gain equal to the sum: 1+(R2/R1). After amplification, the signal is then directed to LM319 comparator 198, which is connected to a 1 kilo ohm potentiometer 200 to allow adjustment and sensitivity of comparator 198.

The output of comparator 198 is sent to 74393 counter 202 which operates to convert the signal to a digital number. The eight output lines from counter 202 are each directed to eight input lines of 8212 buffered latches 204. The data held in buffered latches 204 is transferred to data bus 168 when decoder !94 generates a low voltage signal according to instructions from control bus 170; as the 7404 converter (reference numeral 206) converts the low voltage signal to a high voltage signal which enables the eight output lines of buffered latches 204 to transfer data to the system data bus 168. The software programming takes the data and stores it in memory.

Furthermore, after a selected reading time period for the sensors, the low voltage signals sent through control bus 170 to inputs PB0, PB1 and PB2 of port B of decoder 194. This low voltage signal clears counter 202 and prepares it for the next loop in the program, which will function to direct another reading of the sensors. In the preferred embodiment, board 140 contains signal conditioning for 5 channels (or sensors), whereas board 134 contains signal conditioning for two additional channels (or sensors), plus contains the decoder 194 and converter 206.

Figure 17B:
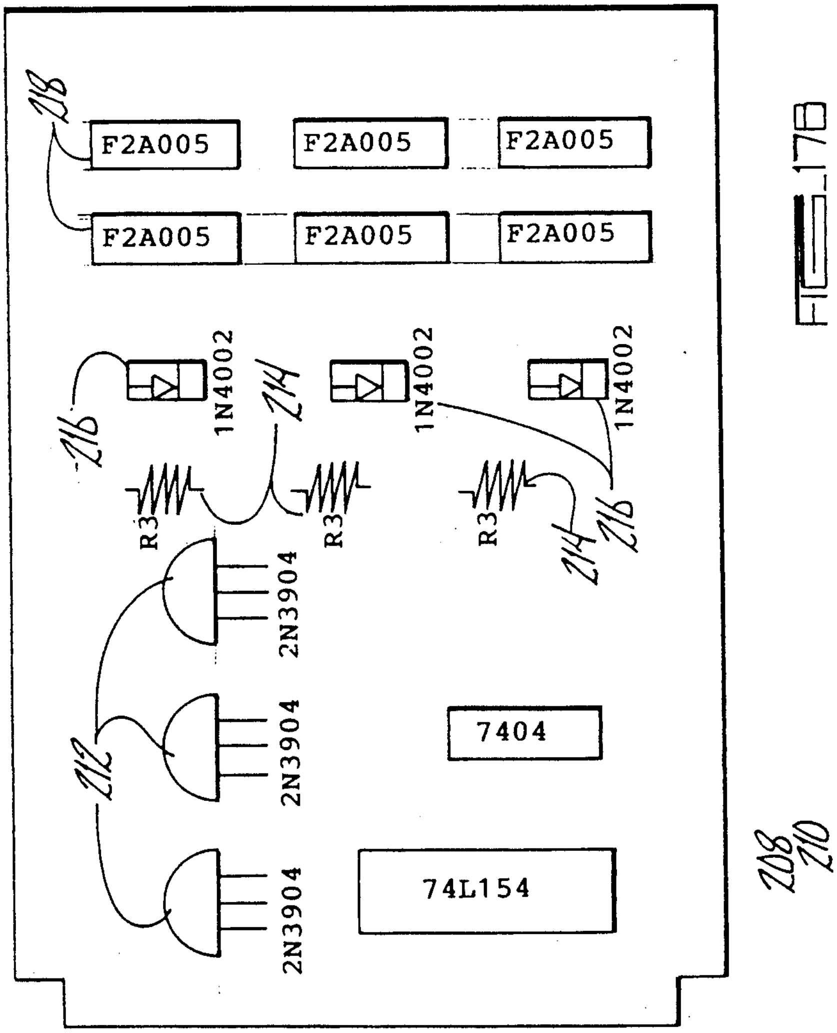
FIGS. 17A and 17B are schematic representations of one embodiment of the motor logic board or stepping motor logic board of FIG. 12.
Figure 17A:
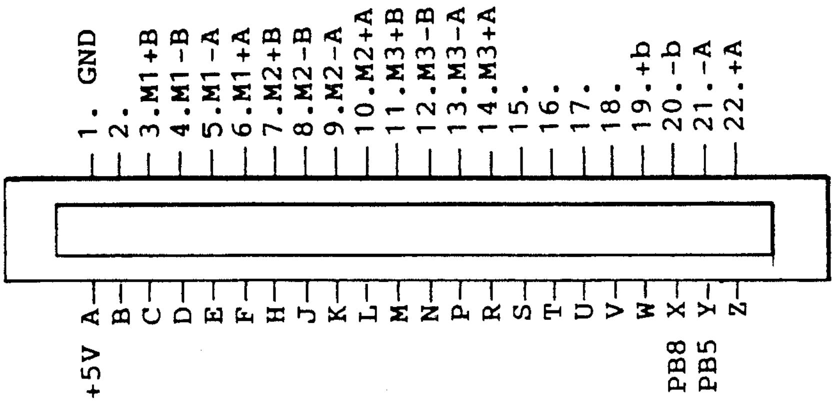

FIGS. 17A and B, 18 and 19A, B and C, are electrical schematics for one embodiment of motor logic selection board 132. FIGS. 17A and B shows generally the combination of electronic parts which are operatively connected upon the standard plug board. A 74L154 decoder (reference numeral 208) and a 7404 hex inverter (reference numeral 210) are used on board 132. Three 2N3904 transistors (reference numeral 212), three resistors 214, and three diodes 216 are also utilized. Finally, six relays 218 are included. Resistors 214 comprise one kilo ohm resistors.

Because processor 66 needs to control each of stepper motors 106, 108 and 110, stepper motor selection logic circuit 132 is utilized to receive the motor control signals from CPU 138, and then select the appropriate stepper motor to be controlled. The signals from board 132 are then sent through stepping motor driving interface board 130 to the appropriate stepping motor.

Figure 18:
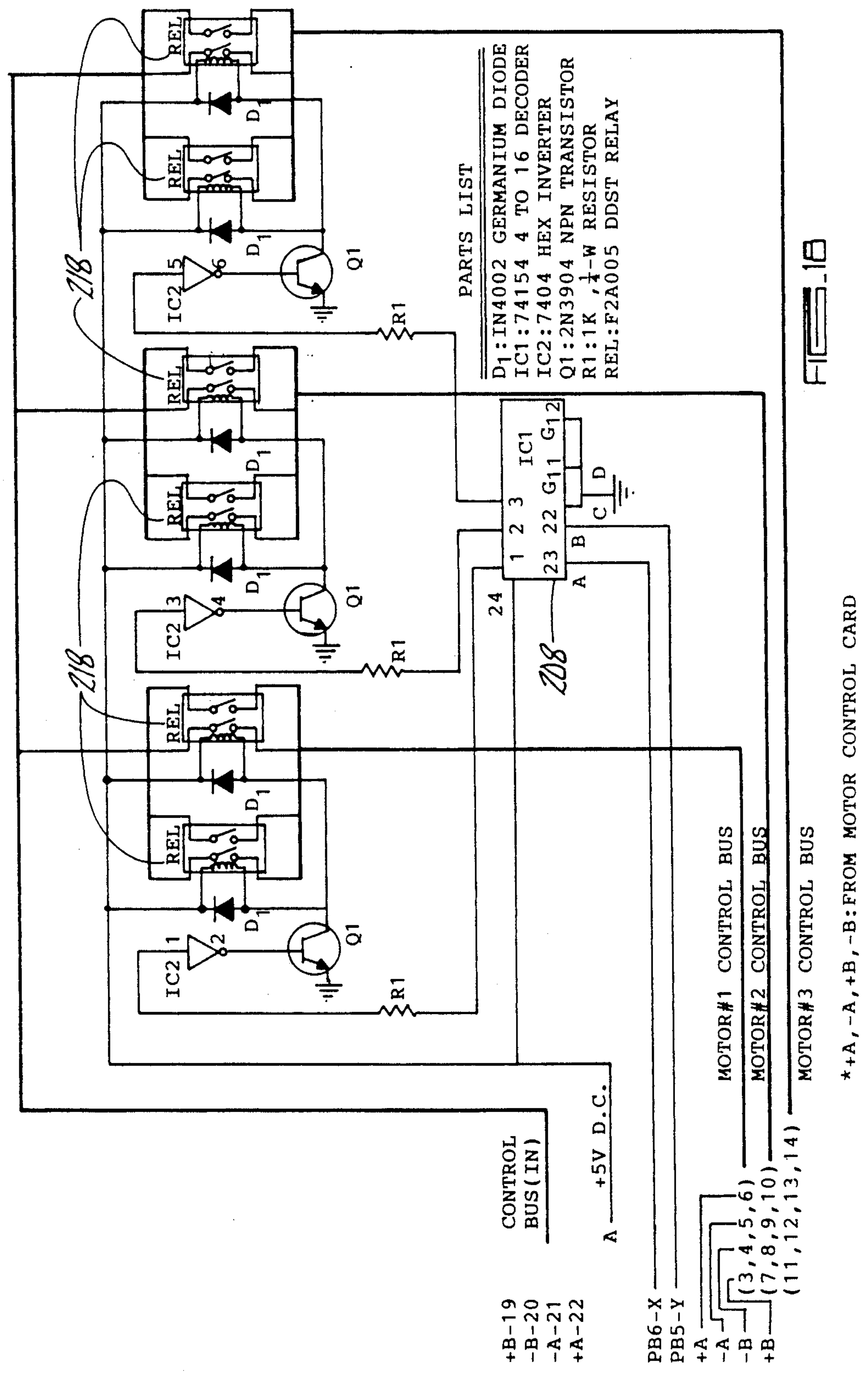
FIG. 18 is an electronic schematic of an embodiment of the motor logic board of FIGS. 17A and 17B.

FIG. 18 shows the exact electronic connection of the various components. It is to be understood that pins PB5 and PB6 receive signals from the system control bus 170 (from CPU 138) and input those signals to decoder 208. Decoder 208 selects which motor is to be controlled by those signals and then transfers the signals from control bus 170 (shown as +B, −B, −A, and +A) through two sets of F2A005 double pole - single throw relays (reference numerals 218) to the desired stepping motor.

Figure 20:
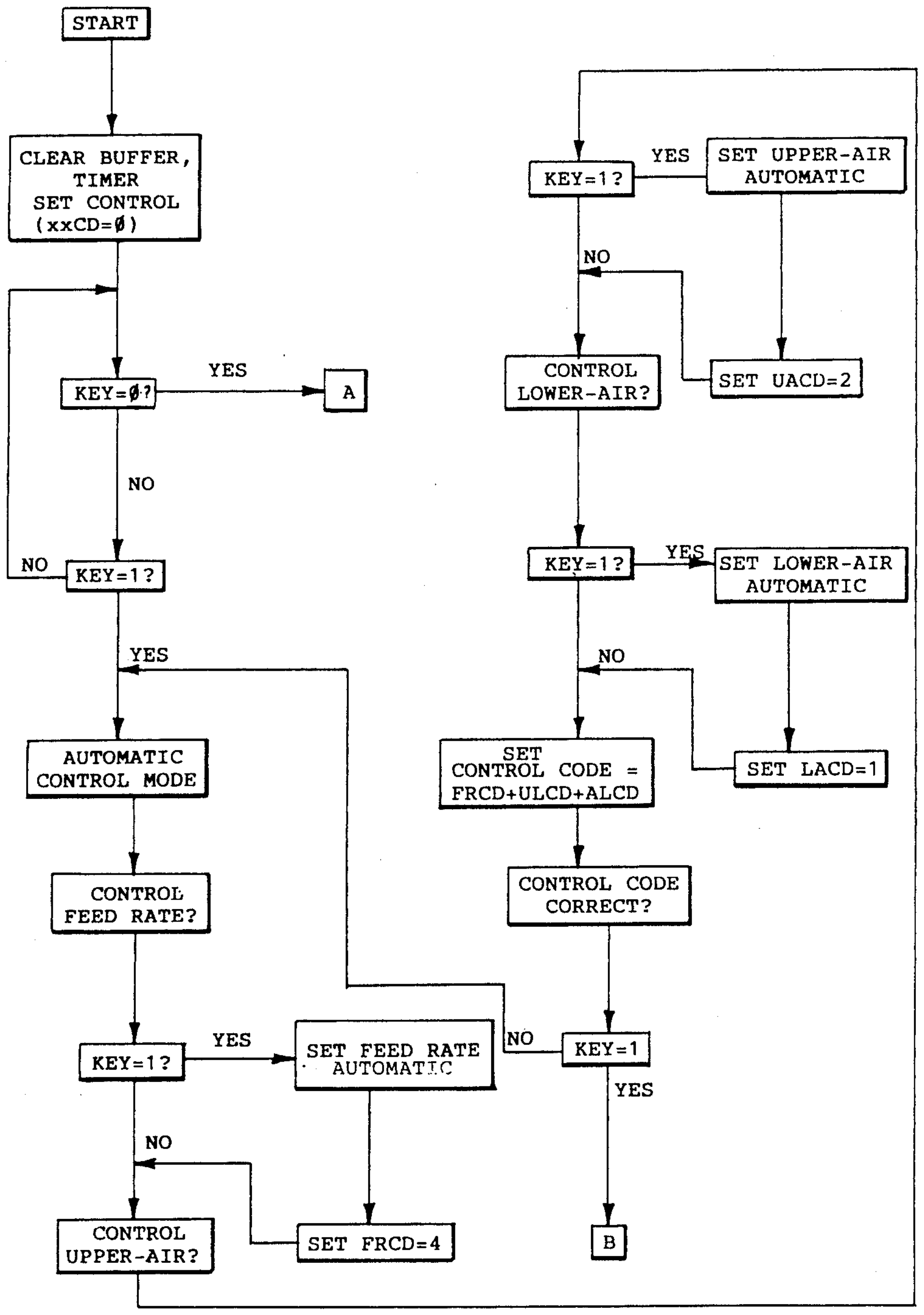
FIGS. 20–31 are schematic flow chart representations of an automatic control program which can be utilized with the invention.
Figure 21:
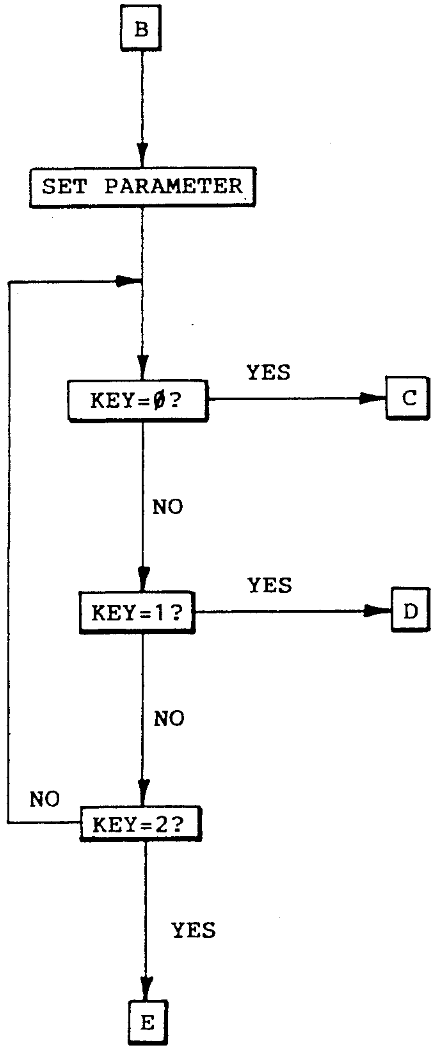

FIGS. 20–31 depict in flow chart form, the programming and operational steps which processor 66 can follow during operation of the invention. FIG. 20 depicts the initializing of the program whereby the operator can choose the mode of operation of processor 66. As previously described, the mode can either be set to (a) simply monitor the separator as it functions, (b) semi-automatically monitor and inform the operator of which settings should be maintained to keep operation within certain predesired ranges, or (c) total autonomous control of the operation. In the monitoring mode, data is collected, displayed, and any undesirable situation is conveyed but no actual adjustment is made by processor 66. In any of those three modes, data can also optionally be transferred to another device, and/or stored for record keeping for future analysis FIG. 21 depicts the part of the software program whereby the ranges or parameters for the separation process to be automatically controlled are input.

Figure 25:
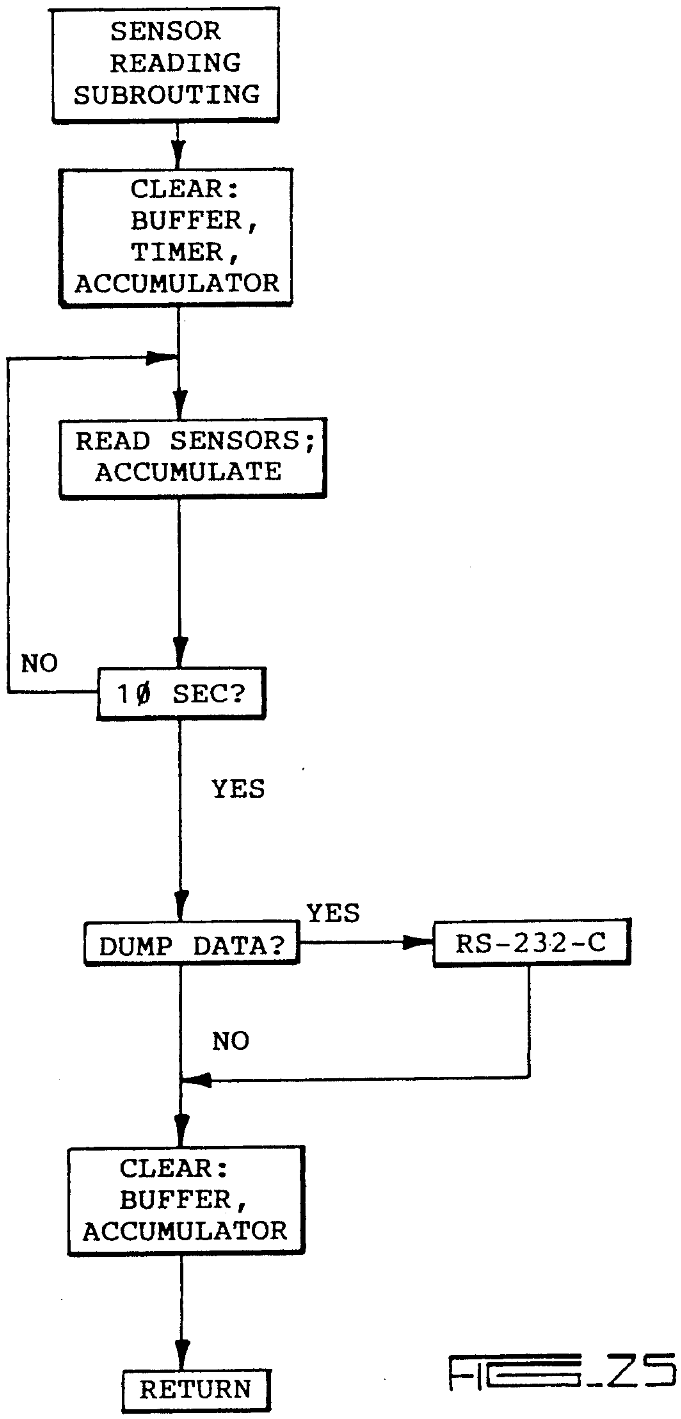

FIG. 25 depicts the operation of the software for obtaining readings from the sensors. Instructions are issued to read all the sensors simultaneously. The readings for each sensor are then accumulated for a preselected specified time period (in FIG. 25 the period is set at 10 seconds, but this can be selected according to desire). The software then instructs processor 66 to compare the accumulated value of the upper-air spout sensor 120, and compares it with the pre-entered, preselected range. If the value is below the prescribed minimum, or above the prescribed maximum, in the automatic mode, processor 66 adjusts either the damper 112 to upper air fan 114 through stepper motor 108, adjusts the speed of feed wheel 24 through stepper motor 106, or adjusts both. Once the value from the upper-air spout sensor 120 is within the prescribed range, processor 66 checks the accumulated value of the reading from the screening spout sensor or bottom screen sensor 58, and compares that value with the range prescribed for it. If the reading is too high or too low (that is, outside the range), processor 66 adjusts the speed of feed wheel 24 through stepper motor 106 accordingly. Processor 66 then checks the reading from lower air spout sensor 60, and similarly brings the readings within its prescribed range by adjusting damper 116 of fan 22 (to adjust the amount of lower air liftings), or the speed of feed wheel 24, or both.

After this adjustment process, processor 66 loops to repeat the reading of the sensor and the corrections. This process continues in the automatic mode until processor 66 is directed otherwise.

In the preferred embodiment, any time an adjustment of air, in either upper air fan 114 or lower air fan 22 is made, processor 66 initiates another reading of the sensors and loops back to start the correction process over again. On the other hand, if feed rate through feed wheel 24 is changed at any time, processor 66 waits for a specified time period (in the preferred embodiment 45 seconds, or otherwise if desired), and then loops to repeat the process of reading the sensors and correcting. This software routine is depicted in FIGS. 27–30.

Specific parameters used in the preferred embodiment of the invention are described as follows. If the readings at either upper or lower air lifting sensors 120 or 60 are below the minimum pre-set value, and the respective damper of the respective fan is not fully open, the software instructs processor 138 to in turn instruct the appropriate stepper motors to increase air by opening the corresponding damper electro-mechanically. The damper is then opened approximately 2° by the stepper motor, and the result is then checked.

Conversely, if the reading from the appropriate sensor is above the maximum value, air is decreased by closing the respective damper electro-mechanically. The amount of closing of the dampers is related to the difference between the signal read and the maximum value allowable according to the following prescription: 80>reading>max—decrease damper by 2°; 200>reading>max—decrease damper by 5°; and reading>200—decrease damper by 10°. It is to be understood that both the values of "80" and "200" can be changed, as can the degree of damper closing (2°, 5°, or 10°) according to desire. It has been determined that these specifications insure uniformity of seed quality, when the invention is used for seed separation, without loss of good seeds.

Processor 66 also can decrease the feed rate of feed wheel 24 if the reading from either the upper air or lower air sensors 120 and 60 is less than the minimum value assigned, and the damper for the respective fan 114 or 22 is fully opened. If it should occur that the feed rate is already at a minimum, a warning can be issued by processor 66, either through display 148, or by some other alarm means. It is to be understood that the software modifies the values of the optimum sensor reading range if the feed rate is changed during operation.

The feed rate is also decreased if the reading from bottom screen sensor 58 exceeds the maximum allowable value, and the feed rate is above the specified minimum feed rate. Conversely, the feed rate is increased if the reading from bottom screen sensor 58 is below the minimum value (usually 0) and the feed rate is below the specified maximum feed rate.

Figure 26:
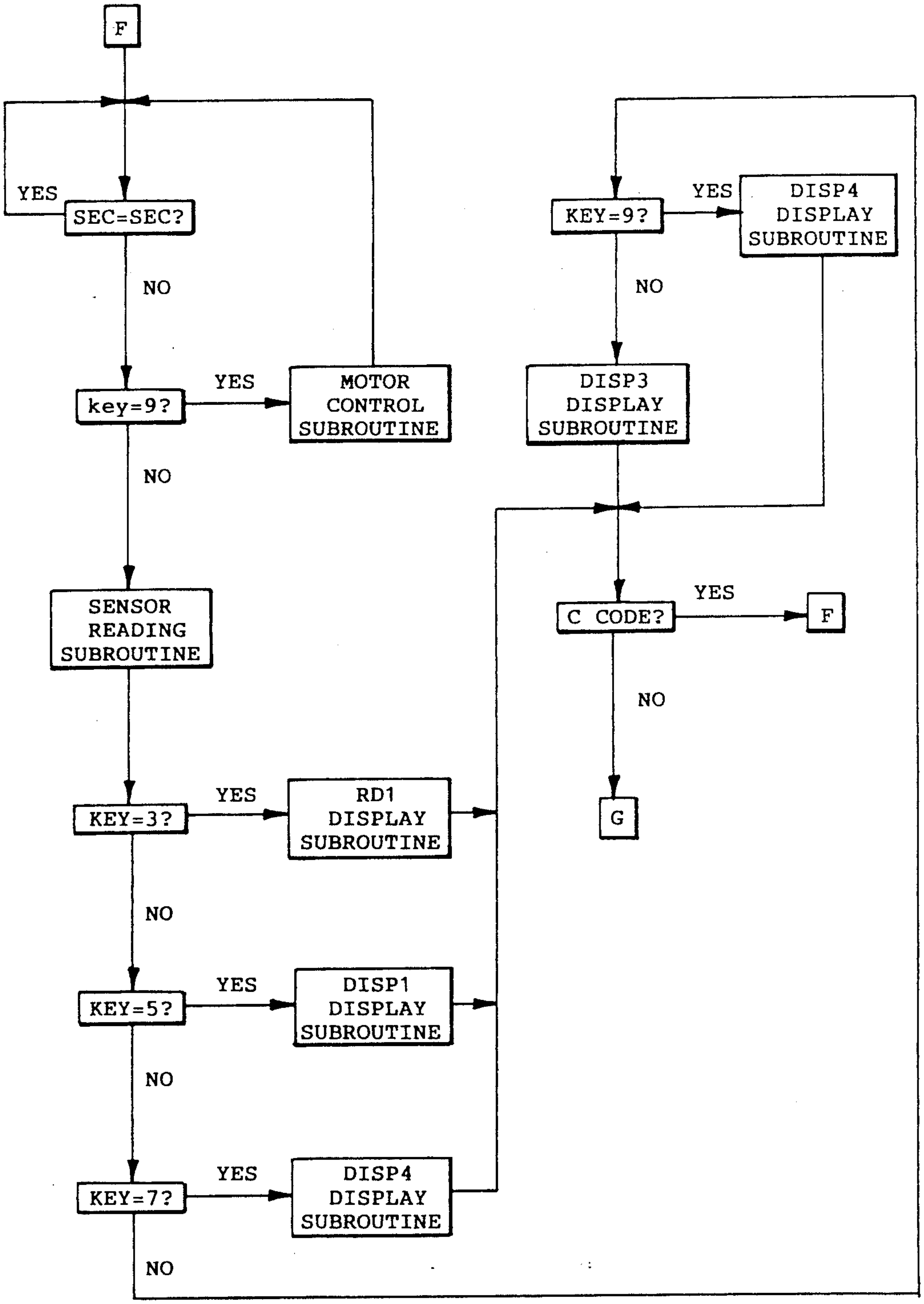
Figure 27:
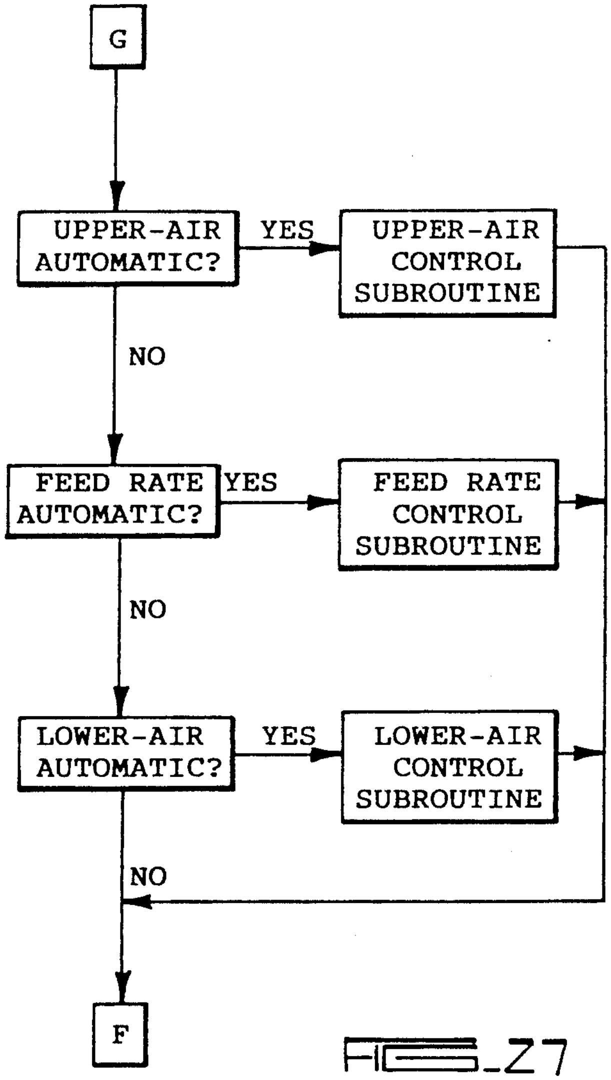
Figure 28:
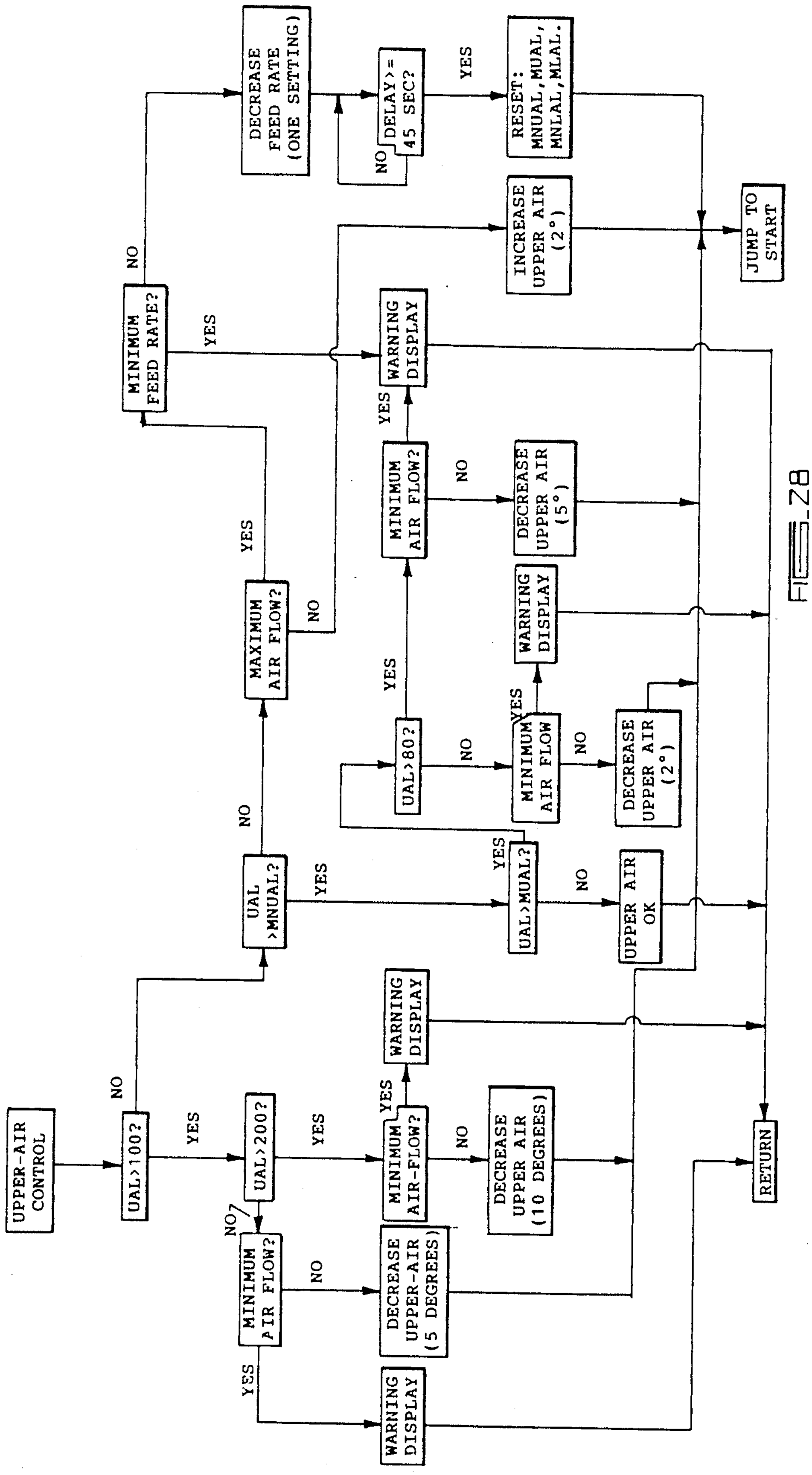
Figure 29:
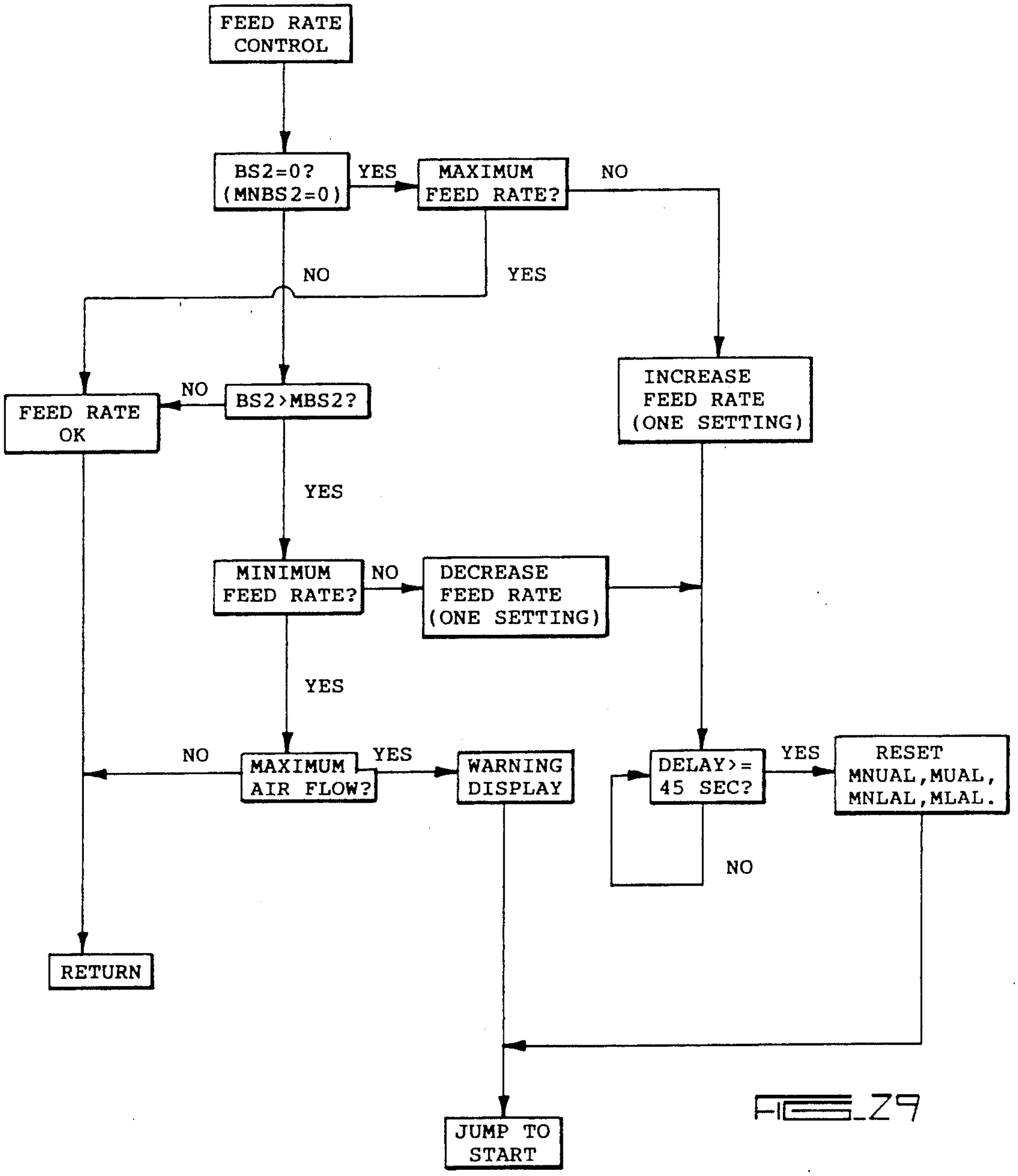
Figure 30:
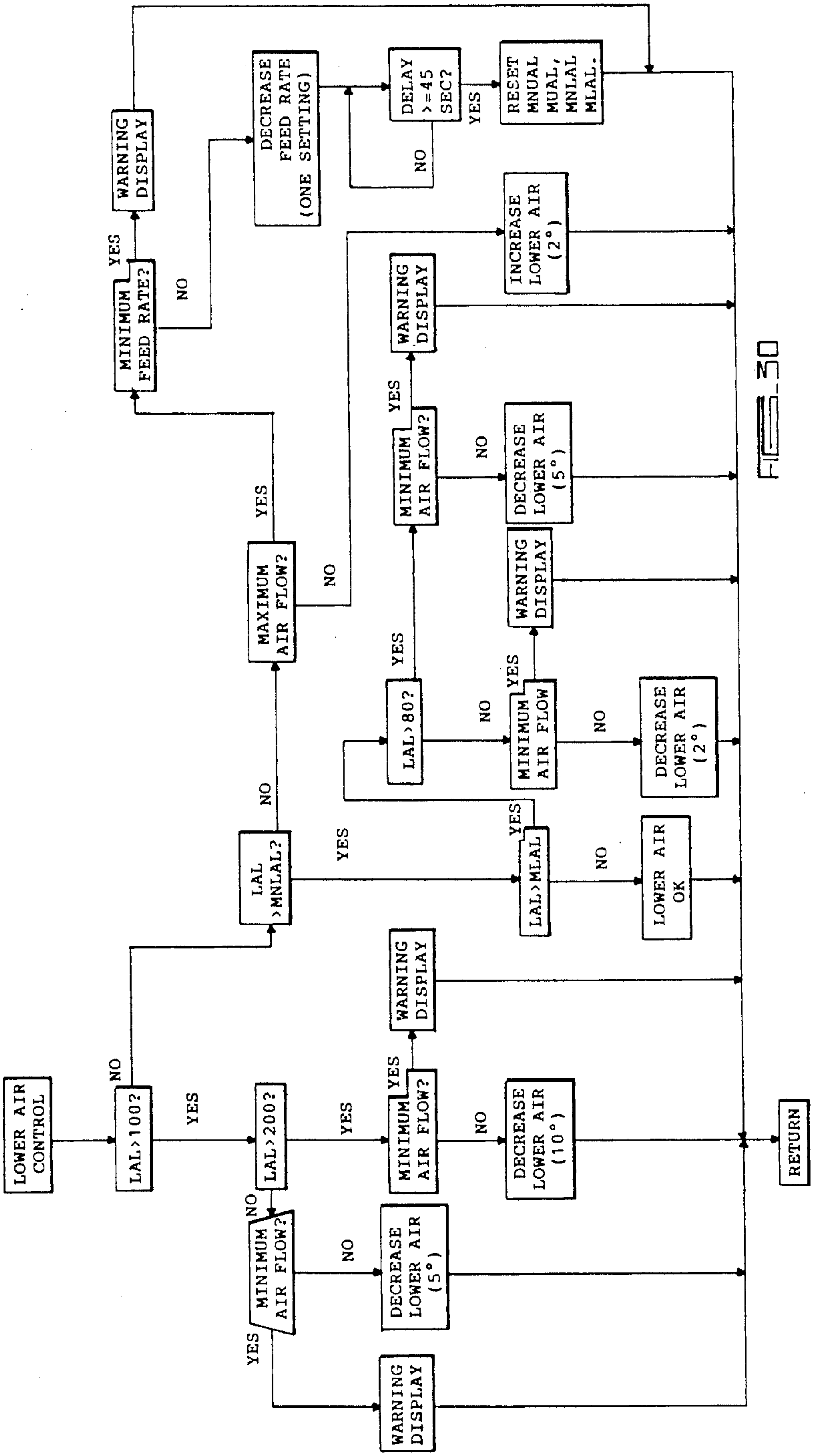

FIG. 21 again depicts the software programming which allows the invention to have three modes of operation to provide flexibility for the operator. For example, the operator can change the adjustments of upper air, lower air and feed rate by using keyboard 146 of processor 66. This operation is depicted in FIG. 26. Additionally, the software functions depicted in FIG. 26 allows the operator to display the various sensors' readings at any time by pressing a specific key (for example, pressing key 5 displays the reading of lower air at any time).

Figure 22:
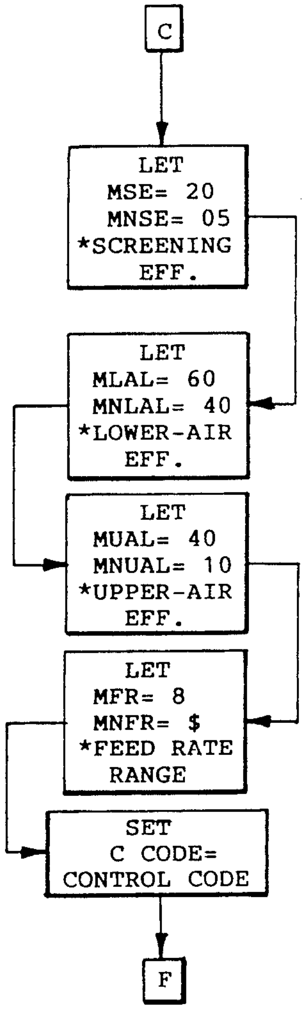

By selecting key "0" in FIG. 21, the "completely automatic" mode is selected as depicted in FIG. 22. In the completely automatic mode, processor 66 uses preset values as the optimum ranges for operation of the separator.

Figure 23:
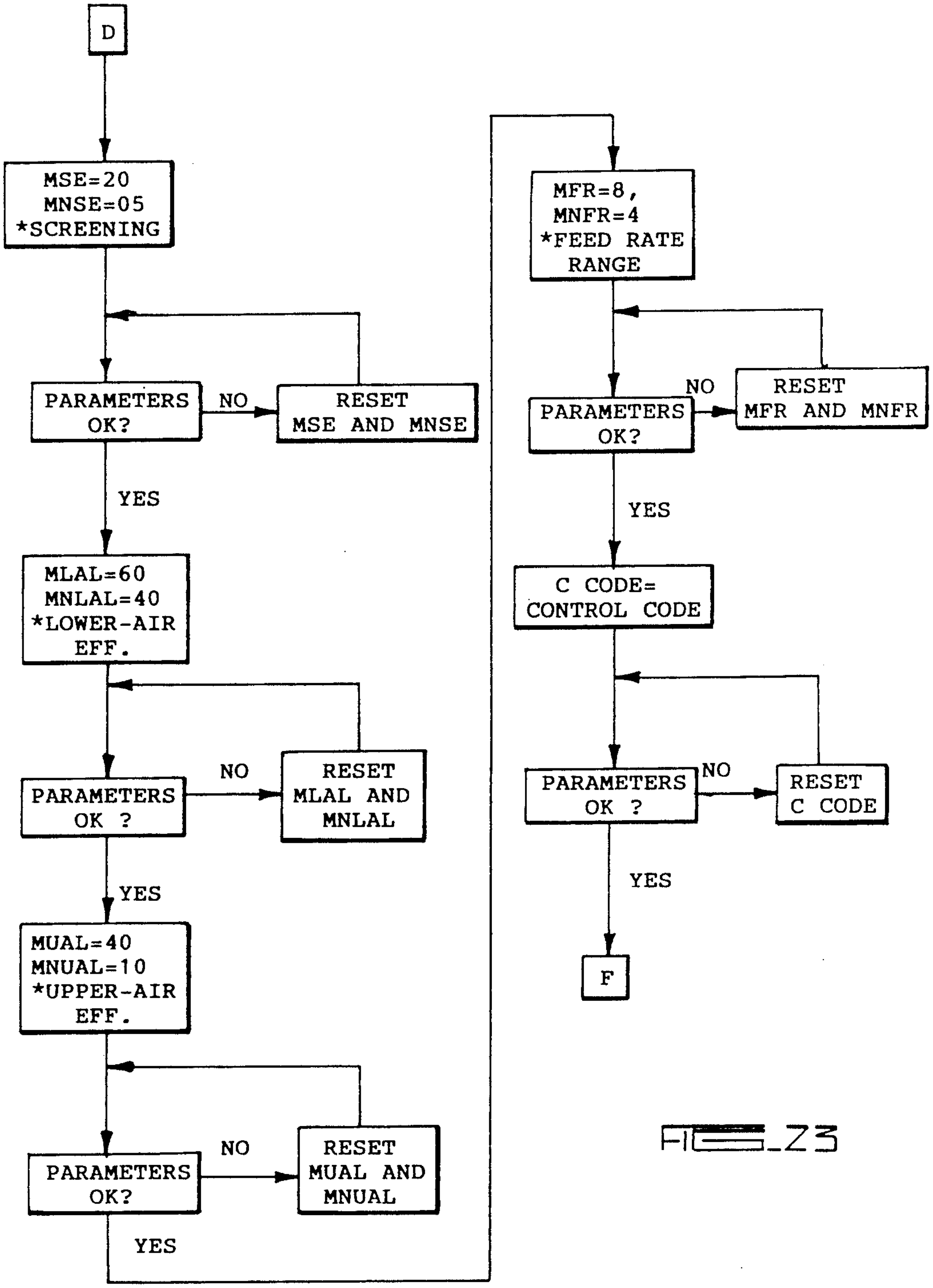
Figure 24:
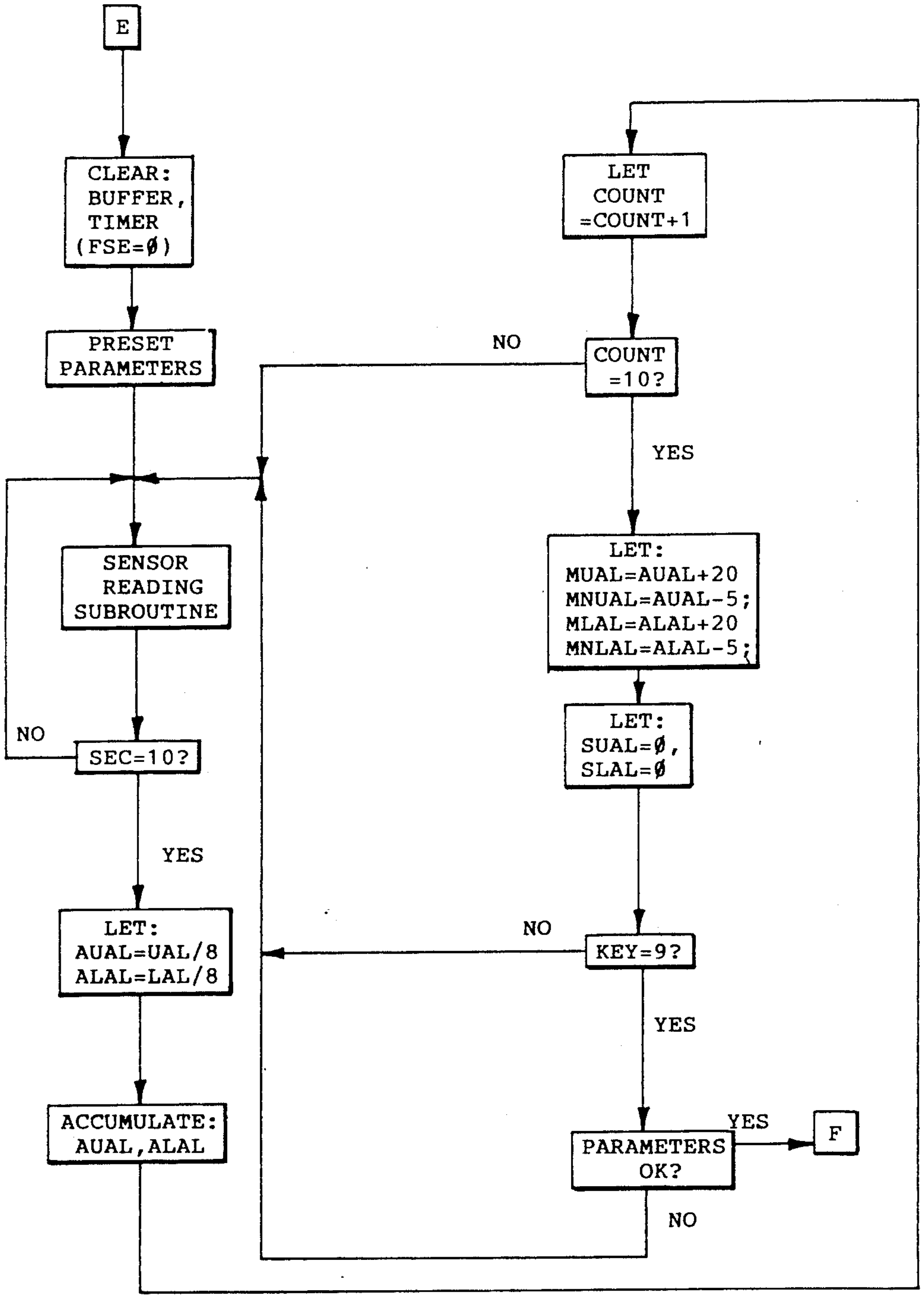

By selecting key "1" in FIG. 21, the "semiautomatic" mode is selected as depicted in FIG. 23. In this mode, the operator assigns values that are used as optimum values Finally, by selecting key "2" in FIG. 21, an "automatic pilot" mode is selected which is depicted in FIG. 24. In this mode, the operator adjusts the machine and the computer maintains the status by measuring the values for a few minutes in the beginning, and computes the range using the average.

Figure 31:
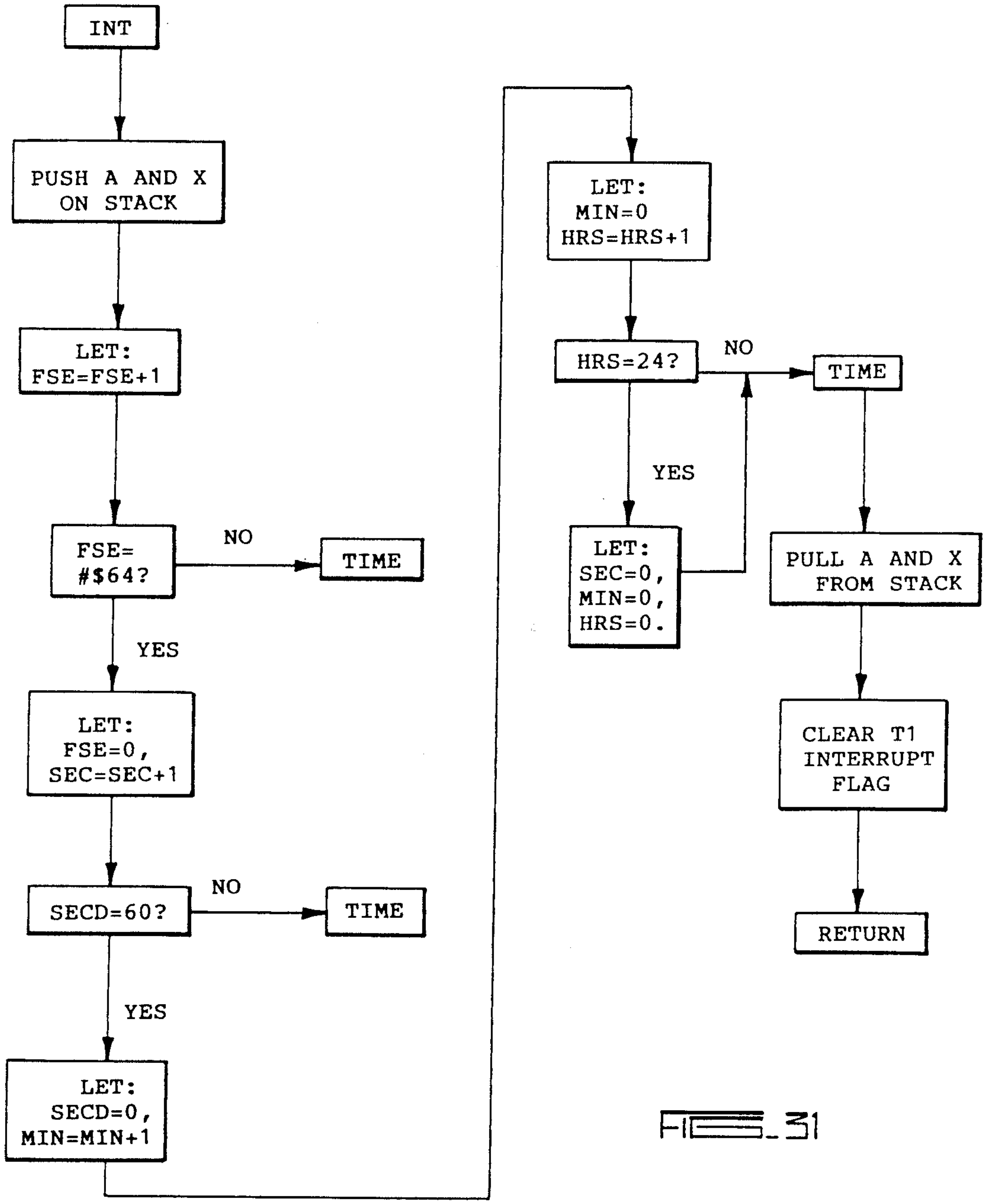
Figure 3Z:
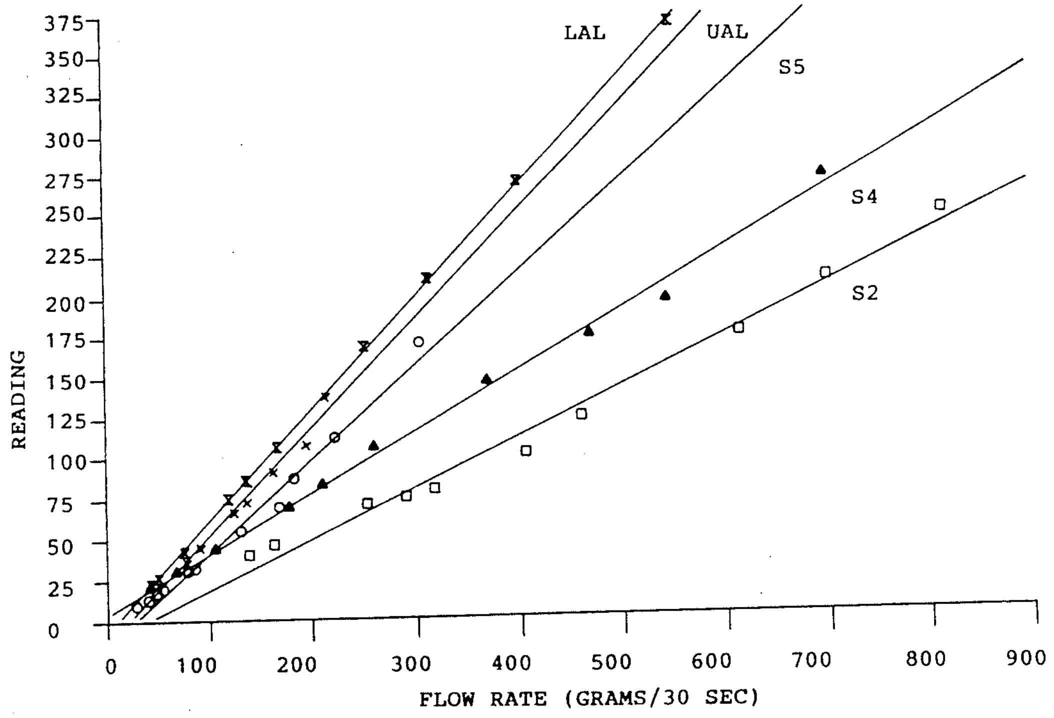

FIG. 31 depicts the software flow chart for a 24-hour clock interrupt service routine which is used by the other parts of the software.

Appendix A, attached to this specification, sets forth a specific object code for software according to the invention, and according to FIGS. 20–31. It is to be understood, however, that variations in the programming can be utilized while staying within the boundaries of the present invention. Options and alternatives to the programming can be used, such as are well within the skill of those of ordinary skill in the art.

FIG. 32 graphically depicts the linear relationship between reading of the various sensors of the preferred embodiment of the invention, and increase in flow rate of the material being separated. It can therefore be seen that by adjusting parameters of the separator through the use of processor 66, selected separation output of materials can be achieved.

It will be appreciated that the included preferred embodiment is given by way of example only, and not by way of limitation to the invention, which is solely described by the claims herein. Variations obvious to one skilled in the art will be included within the invention defined by the claims.

It is understood that the cleaning system of the present invention is not limited to seed cleaning, but rather can be utilized for the cleaning of any type of mixture of particulate materials wherein oversized and undersized materials are separated and/or wherein lighter and heavier materials are separated.

Thus, it is seen that the present invention encompasses at least all of the stated objectives.

APPENDIX A

Auto. Control Main Program.
Program: C000/C9FF
Text : 1000/70FF
Ver: April 28, 1987.

```
OUT=

        *=$00
RUN     *=*+1
HOUR    *=*+1
MIN     *=*+1
SECO    *=*+1
DECM    *=*+12
UAL     *=*+1
LAL     *=*+1

        *=$C040
NEWSET
        JSR CLR
        LDX #0
FIRST   LDA TT,X
        JSR OUTPUT
        JSR DELAY
        INX
        CPX #20
```

```
DR1=$9200
CTR1=$9201
BR1=$9400
*=$A000
 DRB *=*+1
 DRA *=*+1
DDRB *=*+1
DDRA *=*+1
T1CL *=*+1
T1CH *=*+1
READ=$E93C
ACR =$A00B
CLR=$EB44
DEBK1=$ED2C
OUTPUT=$E97A
PCR=$A00C
IER =$A00E
PDRA=$A480
PDRB=$A482
RDRUB=$E95F
RCHECK=$E907
CRCK=$EA24
IRQV=$A404
NUMA=$EA46
OUTD=$EF05
PHXY=$EA9E
PLXY=$EBAC
 *=$40
 MLAL *=*+1
 MNLAL *=*+1
 MUAL *=*+1
 MNUAL *=*+1
 MSE *=*+1
 MNSE *=*+1
 FR *=*+1
 MFR *=*+1
 MNFR *=*+1
 ANG *=*+1
TURNN *=*+1
ANGN *=*+1
 CCODE *=*+1
UANG *=*+1
UTURN *=*+1
UANGN *=*+1
 *=$50
DMCHK *=*+1
 COUNT *=*+1
 *=$60
 TEMUA *=*+1
 TEMLA *=*+1
 TEMFR *=*+1
 CLI
 LDA #00
 STA TEMUA
 STA TEMLA
 STA TEMFR
```

```
BSE *=*+1
SLE *=*+1
TOTAL *=*+1
FSEC *=*+1
TSEC *=*+1
HEXT *=*+2
HEXA *=*+1
DSTR *=*+1
KEYM *=*+1
DIS *=*+1
MTCON *=*+1
TH *=*+1
TM *=*+1
DDRB *=*+1
*=$0100
 JMP PRESET
*=$010F
 JMP NEWSET
 *=$0112
 JMP $D000
 *=$0200
PRESET
 LDA #$FF
 STA COUNT
 LDA #$60
 STA MLAL
 LDA #$40
 STA MNLAL
 LDA #$40
 STA MUAL
 LDA #$10
 STA MNUAL
 LDA #$20
 STA MSE
 LDA #$05
 STA MNSE
 LDA #4
 STA FR
 LDA #2
 STA MFR
 LDA #2
 STA MNFR
 LDA #$30
 STA ANG
 LDA #00
 STA CCODE
 LDA #$40
 STA UANG
 LDA #$01
 STA DMCHK
 JMP PREGO
CONT LDA DSTR
 CMP #$40
 BNE DP1
 JSR RD1
 JMP CLEN
```

```
 BNE FIRST
 JSR DELAY
 JSR DISP0
 JSR DFESL
 JSR DISP1
 JSR DFUAL
 JSR DISPU
 JSR DPLAL
 JSR DISPL
PREGO
 JSR RD1
 LDA #$00
 STA DSTR
 LDA COUNT
 CMP #$FF
 BNE NOSET
 LDA #$0C
 STA BR1
 LDA #$4E
 STA CTR1
 LDA #$3C
 STA CTR1
NOSET
 LDA #0
 STA DDRA
 LDA #$FF
 STA DDRB
 LDA #$C0
 STA ACR
 LDA #$C0
 STA IER
 LDA #$77
 STA DRB
 LDA #$70
 STA DRB
 LDX #0
 LDA #0
RECL STA HOUR,X
 INX
 CPX #21
 BNE RECL
 LDA #$80
 STA DSTR
 LDA #$F0
 STA T1CL
 LDA #$3C
 STA T1CH
 LDA #<IIRQ
 STA IRQV
 LDA #>IIRQ
 STA IRQV+1
 LDA #$77
 STA DRB
 LDA #$70
 STA DRB
 PLA
```

```
START
 LDA SECD
 CMP SECD
 BEQ START
ACCU
 LDA #$EF
 STA PDRA
 LDA PDRB
 EOR #$FF
 BNE DP
 LDA DSTR
DP STA DSTR
 CMP #$08
 BNE DPA
 JSR MOTOR
 JMP NOC
DPA
 LDA #$71
 STA DRB
 LDX #0
 JSR SENS
 LDA #$72
 STA DRB
 LDX #2
 JSR SENS
 LDA #$73
 STA DRB
 LDX #4
 JSR SENS
 LDA #$74
 STA DRB
 LDX #6
 JSR SENS
 LDA #$75
 STA DRB
 LDX #8
 JSR SENS
 LDA #$76
 STA DRB
 LDX #10
 JSR SENS
 LDA #$77
 STA DRB
 LDA #$70
 STA DRB
 LDA SECD
 AND #$0F
.CMP #0
 BEQ CONT
 JMP ACCU

 CMP #2
 BEQ MOT2
```

```
DP1 CMP #$20
 BNE DP2
 JSR DISP1
 JMP CLEN
DP2 CMP #$10
 BNE DP3
 JSR DISP4
 JMP CLEN
DP3 CMP #$08
 BNE DP5
 JSR RD1
 JMP CLEN
DP5 JSR DISP3
CLEN
 LDA DMCHK
 CMP #$01
 BNE NODM
 JSR DUMP
NODM
 LDA CODE
 AND #$04
 CMP #4
 BEQ AUUA
 JMP FRCH
AUUA
 SED
 LDA DECM+10
 CMP #$00
 BEQ CHUA1
 INC TEMUA
 LDA TEMUA
 CMP #2
 BEQ DEUA
 JMP FRCH
CHUA1
 LDA UAL
 CMP MNUAL
 BCS CHUA
MTUA
 NOP
 PHA
 JSR URI
 LDX #0
 LDA #$10
 STA DRB
MTUA1 LDA #$FF
 STA TSEC
MTUA2
 LDA #$00
 STA DRB
 LDA TSEC
 BNE MTUA2
 INX
 CPX #6
 BNE MTUA1
 MOT2A
  LDA #$48
```

```
 CLI
 LDA #2
 ADC UANG
 STA UANG
 JMP NOC
URI LDX #0
 JSR CLR
RB1 LDA RB,X
 JSR OUTPUT
 INX
 CPX #20
 BNE RB1
 RTS
CHUA LDA UAL
 CMP MUAL
 BCS DEUA
 JMP FRCH
DEUA PHA
 JSR UR0
 LDX #0
 LDA #$10
 STA DRB
MTUB1 LDA #$FF
 STA TSEC
MTUB2 LDA #$00
 STA DRB
 LDA TSEC
 BNE MTUB2
 INX
 CPX #6
 BNE MTUB1
 LDA #$77
 STA DRB
 LDA #$70
 STA DRB
 PLA
 SEC
 LDA UANG
 SBC #2
 STA UANG
 LDA #0
 STA TEMUA
 JMP NOC
FRCH LDA CODE
 AND #$02
 CMP #2
 BEQ AUFR
 JMP LACH
AUFR
 LDA DECM-4
 CMP #0
 BEQ CHFR1
 INC TEMFR
 LDA TEMFR

 CMP #3
 BEQ RDE
```

```
JMP AIR
HFR1
LDA BS2
CMP #00
BNE U1
LDA FR
CMP MFR
BEQ AIR1
JSR S0
INC FR
CLC
PHA
LDA #$05
ADC MNLAL
STA MNLAL
LDA #$50
STA DRB
LDA #$FF
STA TSEC
MOT1A
LDA #$40
STA DRB
LDA TSEC
BNE MOT1A
PLA
JMP NFR
AIR1 LDX #0
AIR1A LDA AIR1B,X
JSR OUTPUT
INX
CPX #20
BNE AIR1A
JMP LACH
U1
LDA BS2
CMP MSE
BCC AIR2
MOT2
LDA FR
CMP MNFR
BNE MOT2B
JMP STOP
MOT2B
LDA ANG
CMP #$90
BCS DEMF1
JSR F0
DEMF2
DEC FR
SEC
PHA
LDA MNLAL
SBC #$05
STA MNLAL
LDA #$50
STA DRB
LDA #$FF
STA TSEC
STA DRB
LDA TSEC
BNE MOT2A
PLA
JMP NFR
DEMF1 LDX #0
DEMFA LDA DEMFB,X
JSR OUTPUT
INX
CPX #20
BNE DEMFA
LDA FR
SBC #1
STA MFR
JMP DEMF2
AIR2 JMP LACH
NFR
NOP
LDA #$77
STA DRB
LDA #$70
STA DRB
JSR NFR1
PHA
LDX #0
NFRAA
LDA #$FF
STA TSEC
NFRA
LDA TSEC
BNE NFRA
INX
CPX #40
BNE NFRAA
PLA
JMP NOC
NFR1 PHA
LDX #0
JSR CLR
NFR2 LDA NF,X
JSR OUTPUT
INX
CPX #20
BNE NFR2
PLA
RTS
RD1 LDX #0
JSR CLR
LDA CCODE
CMP #7
BEQ RDA
CMP #6
BEQ RDB
CMP #5
BEQ RDC
CMP #4
BEQ RDD
CMP #2
BEQ RDF
CMP #1
BEQ RDG
JMP RDH
RDA LDA RDA1,X
JSR OUTPUT
INX
CPX #20
BNE RDA
RTS
RDB LDA RDB1,X
JSR OUTPUT
INX
CPX #16
BNE RDB
RTS
RDC LDA RDC1,X
JSR OUTPUT
INX
CPX #16
BNE RDC
RTS
RDD LDA RDD1,X
JSR OUTPUT
INX
CPX #12
BNE RDD
RTS
RDE LDA RDE1,X
JSR OUTPUT
INX
CPX #16
BNE RDE
RTS
RDF LDA RDF1,X
JSR OUTPUT
INX
CPX #12
BNE RDF
RTS
RDG LDA RDG1,X
JSR OUTPUT
INX
CPX #12
BNE RDG
RTS
RDH LDA RDH1,X
JSR OUTPUT
INX
CPX #14
BNE RDH
RTS
STOP NOP
PHA
LDX #0
JSR CLR
```

```
STOP1 LDA STOPA,X
 JSR OUTPUT
 INX
 CPX #20
 BNE STOP1
 PLA
 LDA ANG
 CMP #$90
 BEQ WORST
 JMP LACH
WORST LDX #0
WORST1 LDA WORSTA,X
 JSR OUTPUT
 INX
 CPX #20
 BNE WORST1
 LDA FR
 STA MFR
 JMP NOC
LACH LDA CCODE
 AND #$01
 CMP #1
 BEQ AIR
 JMP NOC
AIR
 LDA DECM+2
 CMP #$00
 BEQ CHLA1
 INC TEMLA
 LDA TEMLA
 CMP #2
 BEQ TUR1A
 JMP NOC
CHLA1
 LDA LAL
 CMP MNLAL
 BCS X1
 JSR MTLA
 JMP NOC
TUR1A CMP #1
 BNE TUR1B
 JMP TUR2
TUR1B JMP TUR1
MTLA
 NOP
 SED
 CLC
 LDA ANG
 CMP #$90
 BCS DEMP
 LDA #2
 ADC ANG
 STA ANG
 CLD
 PHA
 JSR R0
 LDA #$38
 STA DRB
 LDX #0
MTLA1 LDA #$FF
 STA TSEC
MTLA2
 LDA #$23
 STA DRB
 LDA TSEC
 BNE MTLA2
 INX
 CPX #6
 BNE MTLA1
 LDA #$77
 STA DRB
 LDA #$70
 STA DRB
 PLA
 RTS
DEMP
 JMP MOTI
UR0 PHA
 JSR CLR
 LDX #0
UR0A LDA UR,X
 JSR OUTPUT
 INX
 CPX #20
 BNE UR0A
 PLA
 RTS
R0 PHA
 JSR CLR
 LDX #0
R0A LDA R,X
 JSR OUTPUT
 INX
 CPX #20
 BNE R0A
 PLA
 RTS
X1 LDA LAL
 CMP MLAL
 BCC NOCA
 CMP #$90
 BCS TUR1
 LDA #5
 STA TURNN
 LDA #2
 STA ANGN
 JMP TUR3
NOCA
 JMP NOC
TUR1
 LDA #25
 STA TURNN
 LDA #10
 STA ANGN
 JMP TUR3
TUR2
 LDA #12
 STA TURNN
 LDA #5
 STA ANGN
TUR3
 JSR MTLB
 JMP NOC
MTLB NOP
 SED
 SEC
 LDA ANG
 SBC ANGN
 STA ANG
 CLD
 PHA
 JSR OVER
 LDA #$38
 STA DRB
 LDX #0
MTLB1 LDA #$FF
 STA TSEC
MTLB2
 LDA #$28
 STA DRB
 LDA TSEC
 BNE MTLB2
 INX
 CPX TURNN
 BNE MTLB1
 LDA #$77
 STA DRB
 LDA #$70
 STA DRB
 PLA
 RTS
OVER PHA
 JSR CLR
 LDX #0
OVERB LDA OVER1,X
 JSR OUTPUT
 INX
 CPX #20
 BNE OVERB
 PLA
 RTS
NOC
 LDA TEMLA
 CMP #2
 BNE NCHKLA
 LDA #0
 STA TEMLA
NCHKLA
 LDA MIN
 CMP #5
 BNE NONEW
 LDA #0
 STA TEMUA
 STA TEMLA
NONEW
 LDA #0
 LDX #0
```

```
REP2 STA DECM,X
 INX
 CPX #17
 BNE REP2
RECHK
 LDA SECD
 AND #$0F
 CMP #0
 BNE RECHK
 JMP START
SDATA JMP START
DELAY LDY #0
DEL INY
 JSR DEBK1
 CPY #$1F
 BNE DEL
 RTS
IIRQ PHA
 LDA #$FF
 STA TSEC
 SED
 CLI
 LDA #1
 ADC FSEC
 STA FSEC
 CMP #$64
 BNE TIME
 LDA #0
 STA FSEC
 STA TSEC
 CLC
 LDA #1
 ADC SECD
 STA SECD
 CMP #$60
 BNE TIME
 LDA #0
 STA SECD
 CLC
 LDA #1
 ADC MIN
 STA MIN
 CMP #$60
 BNE TIME
 LDA #0
 STA MIN
 CLC
 LDA #1
 ADC HOUR
 STA HOUR
 CMP #24
 BNE TIME
TIME LDA T1CL
 PLA
 RTI
DISP0 JSR CLR
 LDX #0
DIS0A LDA DIS0,X
 JSR OUTPUT
```

```
 INX
 CPX #13
 BNE DIS0A
 LDA CCODE
 JSR NUMA
 JSR READ
 CMP #$0D
 BNE NCODE
 RTS
NCODE
 JSR RCHECK
 JSR RDRUB
 ASL A
 ASL A
 ASL A
 ASL A
 AND #$00
 STA CCODE
 JSR RCHECK
 JSR RDRUB
 AND #$0F
 CLC
 ADC CCODE
 STA CCODE
 JMP DISP0
DISP1 JSR CLR
 PHA
 LDA #$0D
 JSR OUTD
 LDA CCODE
 JSR NUMA
 LDA #$20
 JSR OUTD
 LDX #0
DISP LDA MESG,X
 JSR OUTPUT
 INX
 CPX #7
 BNE DISP
 LDA HOUR
 JSR NUMA
 LDA #':
 JSR OUTD
 LDA MIN
 JSR NUMA
 LDA #':
 JSR OUTD
 LDA SECD
 JSR NUMA
 LDA #$20
 JSR OUTD
 PLA
 RTS
DISP2
 JSR CLR
 LDX #0
DSP21 LDA DSP2A,X
 JSR OUTPUT
```

```
 INX
 CPX #10
 BNE DSP21
 LDA FR
 JSR NUMA
 LDA DSTF
 CMP #$40
 BNE DSP2R
 RTS
DSP2R
 JSR READ
 CMP #$0D
 BNE NFEED
 RTS
NFEED JSR RCHECK
 JSR RDRUB
 ASL A
 ASL A
 ASL A
 ASL A
 AND #$F0
 STA FR
 JSR RCHECK
 JSR RDRUB
 AND #$0F
 CLC
 ADC FR
 STA FR
 JMP DISP2
DISPU JSR CLR
 LDX #0
DSPU1 LDA DSPUA,X
 JSR OUTPUT
 INX
 CPX #15
 BNE DSPU1
 LDA VANG
 JSR NUMA
 JSR READ
 CMP #$0D
 BNE NUP
 RTS
NUP JSR RCHECK
 JSR RDRUB
 ASL A
 ASL A
 ASL A
 ASL A
 AND #$F0
 STA VANG
 JSR RCHECK
 JSR RDRUB
 AND #$0F
 CLC
 ADC VANG
 STA VANG
 JMP DISPU
DISPL JSR CLR
 LDX #0
```

```
DSPL1 LDA DSPLA,X
 JSR OUTPUT
 INX
 CPX #15
 BNE DSPL1
 LDA ANG
 JSR NUMA
 JSR READ
 CMP #$0D
 BNE NLOW
 RTS
NLOW JSR RCHECK
 JSR RDRUB
 ASL A
 ASL A
 ASL A
 ASL A
 AND #$F0
 STA ANG
 JSR RCHECK
 JSR RDRUB
 AND #$0F
 CLC
 ADC ANG
 STA ANG
 JMP DISPL
DISP3
 JSR CLR
 LDX #0
DSP31 LDA DSP3A,X
 JSR OUTPUT
 INX
 CPX #4
 BNE DSP31
 LDA DECM+10
 JSR NUMA
 LDA DECM+11
 JSR NUMA
 LDA #$20
 JSR OUTD
 LDA #$20
 JSR OUTD
 LDX #0
DSP32 LDA DSP3B,X
 JSR OUTPUT
 INX
 CPX #4
 BNE DSP32
 LDA DECM+2
 JSR NUMA
 LDA DECM+3
 JSR NUMA
 LDA #$20
 JSR OUTD
 RTS
DISP4
 JSR CLR
 LDX #0
DSP41 LDA DSP4A,X
 JSR OUTPUT
 INX
 CPX #4
 BNE DSP41
 LDA DECM+6
 JSR NUMA
 LDA DECM+7
 JSR NUMA
 LDA #$20
 JSR OUTD
 LDA #$20
 JSR OUTD
 LDX #0
DSP42 LDA DSP4B,X
 JSR OUTPUT
 INX
 CPX #4
 BNE DSP41
 LDA DECM+4
 JSR NUMA
 LDA DECM+5
 JSR NUMA
 LDA #$20
 JSR OUTD
 JSR OUTD
 RTS
DPB52 JSR CLR
 LDX #0
DPBMA LDA DIBM,X
 JSR OUTPUT
 INX
 CPX #9
 BNE DPBMA
 LDA MSE
 JSR NUMA
 LDX #0
DPBNA LDA DIBN,X
 JSR OUTPUT
 INX
 CPX #7
 BNE DPBNA
 LDA MNSE
 JSR NUMA
 JSR READ
 CMP #$0D
 BNE DPB52
 RTS
DPUAL JSR CLR
 LDX #0
DPUMA LDA DIUM,X
 JSR OUTPUT
 INX
 CPX #9
 BNE DPUMA
 LDA MUAL
 JSR NUMA
 LDX #0
DPUNA LDA DIUN,X
 JSR OUTPUT
 INX
 CPX #7
 BNE DPUNA
 LDA MNUAL
 JSR NUMA
 JSR READ
 CMP #$0D
 BNE DPUAL
 RTS
DPLAL JSR CLR
 LDX #0
DPLMA LDA DILM,X
 JSR OUTPUT
 INX
 CPX #9
 BNE DPLMA
 LDA MLAL
 JSR NUMA
 LDX #0
DPLNA LDA DILN,X
 JSR OUTPUT
 INX
 CPX #7
 BNE DPLNA
 LDA MNLAL
 JSR NUMA
 JSR READ
 CMP #$0D
 BNE DPLAL
 RTS
DISP5 JSR CLR
 LDX #0
DSP51 LDA DSP5A,X
 JSR OUTPUT
 INX
 CPX #19
 BNE DSP51
 LDA DMCHK
 JSR NUMA
 JSR READ
 CMP #$0D
 BNE NDM
RTS
NDM JSR RCHECK
 JSR RDRUB
 AND #$0F
 STA DMCHK
 JMP DISP5
F0 PHA
 LDX #0
F0A LDA F01,X
 JSR OUTPUT
 INX
 CPX #20
 BNE F0A
 PLA
 RTS
```

```
SO PHA
 LDX #0
SOA LDA FED,X
 JSR OUTPUT
 INX
 CPX #20
 BNE SOA
 PLA
 RTS
SENS PHA
 CPX #8
 BNE GO1
 LDA DRA
 AND #$F0
 STA HEXA
 JMP GO
GO1 LDA DRA
 STA HEXA
 JMP GO
GO
 JSR HEXD
 CLC
 LDA HEST+1
 ADC DECM+1,X
 STA DECM+1,X
 BCC LOOP
 INC DECM,X
LOOP CLC
 LDA HEST
 ADC DECM,X
 STA DECM,X
 CPX #0
 BEQ SCLS
 CPX #2
 BEQ SLAL
 CPX #4
 BEQ SBS2
 CPX #6
 BEQ STOTAL
 CPX #10
 BEQ SUAL
 PLA
 RTS
SUAL LDA DECM+1,X
 STA UAL
 PLA
 RTS
SBS2 LDA DECM+1,X
 STA BS2
 PLA
 RTS
SLAL LDA DECM+1,X
 STA LAL
 PLA
 RTS
SCLS LDA DECM+1,X
 STA CLS
 PLA
STOTAL LDA DECM+1,X
 STA TOTAL
 PLA
 RTS
HEXD SED
 LDA #0
 STA HEST
 STA HEST+1
 LDA HEXA
 AND #$0F
 CMP #$0A
 BCC NEXT
 CLC
 ADC #6
NEXT STA HEST+1
 LDA HEXA
 AND #$10
 BEQ NEX1
 CLC
 LDA #$16
 ADC HEST+1
 STA HEST+1
NEX1 LDA HEXA
 AND #$20
 BEQ NEX2
 CLC
 LDA #$32
 ADC HEST+1
 STA HEST+1
NEX2 LDA HEXA
 AND #$40
 BEQ NEX3
 CLC
 LDA #$64
 ADC HEST+1
 STA HEST+1
 BCC NEX3
 INC HEST
NEX3 LDA HEXA
 AND #$80
 BEQ NEXL
 CLC
 LDA #$28
 ADC HEST+1
 STA HEST+1
 BCC NEX4
 INC HEST
NEX4 INC HEST
 NEXL NOP
 RTS
DUMP NOP
 PHA
 SED
 LDX #0
 LDY #0
 LDA DECM-3
 AND #$0F
 ASL A
 STA TH
 LDA DECM-2
 AND #$F0
 LSR A
 LSR A
 LSR A
 LSR A
 ORA TH
 STA TH
 JSR ASCI
 LDA DECM-1
 AND #$0F
 ASL A
 ASL A
 ASL A
 ASL A
 STA TM
 LDA DECM-1
 AND #$F0
 LSR A
 LSR A
 LSR A
 LSR A
 ORA TM
 STA TM
 JSR ASCI
 LDA #$20
 JSR WAIT
 LDA #$44
 JSR WAIT
 LDA #$41
 JSR WAIT
 LDA #$54
 JSR WAIT
 LDA #$41
 JSR WAIT
 LDA #$20
 JSR WAIT
 LDA FR
 JSR ASCI
 LDA #$2C
 JSR WAIT
 LDA UANG
 JSR ASCI
 LDA ANG
 JSR ASCI
 LDA #$2C
 JSR WAIT
 LDX #0
MP1 LDA DECM,X
 JSR ASCI
 INY
 CPY #2
 BNE TO
 LDA #$2C
 JSR WAIT
 LDY #0
```

```
RTS
BNE MP1
LDA #$0D
JSR WAIT
LDA #$0A
JSR WAIT
PLA
RTS
ASCI PHA
LSR A
LSR A
LSR A
LSR A
JSR MP2
PLA
AND #$0F
MP2 CLC
ADC #$30
CMP #$3A
BCC WAIT
CLC
ADC #1
JSR WAIT
RTS
WAIT PHA
MP1 LDA CTR1
AND #$01
BEQ MP3
PLA
STA DR1
RTS
MOTOR NOP
PHA
ENTER
LDA #$70
STA DRB
LDX #0
LDA #4
STA KEYM
JSR CLR
ENT1 LDA ENT1A,X
JSR OUTPUT
INX
CPX #20
BNE ENT1
JSR READ
CMP #$31
BEQ ADJUA
CMP #$32
BEQ ADJLA
CMP #$0D
BNE ENTER
JMP NEXM
ADJUA LDA #0
STA MTCON
JSR CLR
LDX #0
```

```
ADUA1 LDA ADUAA,X
JSR OUTPUT
INX
ASL A
ASL A
ASL A
CPX #20
BNE ADUA1
JMP DIRCH
ADJLA LDA #$20
STA MTCON
JSR CLR
LDX #0
ADLA1 LDA ADLAA,X
JSR OUTPUT
INX
CPX #20
BNE ADLA1
JMP DIRCH
DIRCH LDA #$DF
STA PDRA
JSR CLR
LDA PDRB
EOR #$FF
BNE MT1
LDA KEYM
MT1 STA KEYM
CMP #$40
BNE MT2
LDA MTCON
ADC #$08
STA DRB
JMP DIRCH
MT2 CMP #$08
BNE MT3
LDA MTCON
STA DRB
JMP DIRCH
MT3 CMP #$20
BNE MT4
JMP ENTER
MT4 LDA #$70
STA DRB
LDA #$77
STA DRB
LDA KEYM
CMP #$80
BEQ NEXM
JMP DIRCH
NEXM LDA #$80
STA DSTR
JSR RD1
PLA
RTS
ENT1A .BYT 'ADJ UA=1
    ADJ LA=2'
ADUAA .BYT 'UPPER AI
R: 8(-UA-)2 '
```

```
ADLAA .BYT 'LOWER AI
R: 8(-LA-)2
DIEN .BYT 'CONTROL [illegible]
ODE:'
MESS .BYT ' TIME=
R .BYT '* INCREASE L
OWER AIR
TO INX
CPX #12
OVER1 .BYT 'WARNING:
OVER MAX LAL'
FED .BYT '* INCREASE
'FEED RATE'
F01 .BYT 'WARNING:FO
OR EIETING'
RB .BYT '* INCREASE
UPPER AIR'
NF .BYT '*CHANGING F
EED WAIT'
OVERB1 .BYT 'WARNING
:OVER MAX UAL
CLEAN .BYT 'CLEAN SC
(BL HR)='
STORA .BYT '** MINIM
UM FEED RATE
DSP1A .BYT 'FEED RAT
E
AIR1B .BYT '** MAXIM
UM FEED RATE
DEMFE .BYT '*AND=30
 MAX FR=FR-1
DSP4A .BYT 'SS1=
DSP4B .BYT 'SS2=
WORSTA .BYT '** CHEC
K CLEANER! **
RDA1 .BYT 'AUTOMATE:
 UA, FR, LA'
RDB1 .BYT 'AUTOMATE:
 UA, FR'
RDC1 .BYT 'AUTOMATE:
 UA, LA'
RDD1 .BYT 'AUTOMATE:
 UA'
RDE1 .BYT 'AUTOMATE:
 FR, LA'
RDF1 .BYT 'AUTOMATE:
 FR'
RDG1 .BYT 'AUTOMATE:
 LA'
RDH1 .BYT 'AUTOMATE:
 NONE'
DSP1A .BYT ' UAL=
UR .BYT 'WARNING:OVE
R MAX UAL
DSP5A .BYT 'DUMP DAT
A (YES=1)'
DIBM .BYT 'SS1 MAX=
```

```
DIBN  BYT '    MIN='
DIUM  BYT 'UAL: MAX=
'
DIUN .BYT '    MIN='
DILM .BYT 'LAL: MA.=
'
DSPIS .BYT 'LAL='
DILN .BYT      MIN='
DSFUA .BYT 'UPPER-FA
N OPEN:'
DSFLA .BYT  LOWER-FA
N OPEN:'
TT  BYT 'CONTROL PRO
GRAM APST
 .END
OUT=
 DEBK1=$ED2C
 RCHECK=$E907
 OUTPUT=$E97A
 RDRUB=$E95F
.CLR=$EB44
 READ=$E93C
 NUMA=$EA45
*=$40
MLAL *=*+1
MNLAL *=*+1
MUAL *=*-1
MNUAL *=*+1
MSE *=*+1
MNSE *=*+1
FR *=*+1
MFR *=*+1
MNFR *=*+1
ANG *=*+1
TURNN *=*+1
ANGN *=*-1
CODE *=*+1
UANG *=*-1
UTURN *=*-1
UANGN *=*+1
*=$50
DMCHK *=*+1
 *=$3000
 LDX #0
 LDA #0
AGAIN STA MLAL,X
 INX
 CPX #20
 BNE AGAIN
 LDA #$60
 STA MLAL
 LDA #$40
 STA MNLAL
 LDA #$05
 STA MUAL
 LDA #$02
 STA MNUAL
```

04/20/87

DATA RESET (START)

```
 LDA #$10
 STA MSE
 LDA #$00
 STA MNSE
 LDA #4
 STA FR
 LDA #8
 STA MFR
 LDA #2
 STA MNFR
 LDA #$30
 STA ANG
 LDA #$30
 STA UANG
 LDA #7
 STA CODE
 LDA #1
 STA DMCHK
ASK JSR CLR
 LDX #0
QUES LDA QUES0,X
JSR OUTPUT
INX
CPX #20
BNE QUES
JSR DELAY
JSR DELAY
LDA #$40
STA $010C
STA $010F
STA $0112
LDA #00
STA $010D
LDA #$00
STA $010E
LDA #$40
STA $110
LDA #$00
STA $0111
LDA #00
STA $0113
LDA #$00
STA $0114
JSR CLR
LDX #0
NAME LDA NAM,X
 JSR OUTPUT
 INX
 CPX #20
 BNE NAME
 JSR DELAY
 JSR DELAY
ASKA JSR CLR
 LDX #0
QUEA LDA QUN,X
 JSR OUTPUT
 INX
```

```
 CPX #20
 BNE QUEA
 JSR READ
 CMP #$30
 BEQ ASK0
 CMP #$31
 BNE ASKA
 JMP $C000
ASK0 JSR CLR
 LDX #00
QES0 LDA QUES0,X
 JSR OUTPUT
 INX
 CPX #13
 BNE QES0
 LDA CODE
 JSR NUMA
 JSR READ
 CMP #$0D
 BNE NCODE
 JMP ASK0A
NCODE
 JSR RCHECK
 JSR RDRUB
 ASL A
 ASL A
 ASL A
 ASL A
 AND #$F0
 STA CODE
 JSR RCHECK
 JSR RDRUB
 AND #$0F
 CLC
 ADC CODE
 STA CODE
 JMP ASK0
ASK0A
 JSR CLR
 LDX #0
QUES0A LDA QUN0A,X
 JSR OUTPUT
 INX
 CPX #3
 BNE QUES0A
 LDA MUAL
 JSR NUMA
 JSR READ
 CMP #$0D
 BNE NMUAL
 JMP ASK1
NMUAL
 JSR RCHECK
 JSR RDRUB
 ASL A
 ASL A
 ASL A
```

```
ASL A
AND #$F0
STA MUAL
JSR RCHECK
JSR RDRUB
AND #$0F
CLC
ADC MUAL
STA MUAL
JMP ASK0A
ASK1
LDX #00
QUES0B LDA QUESN2,
JSR OUTPUT
INX
CPX #7
BNE QUES0B
LDA MNUAL
JSR NUMA
JSR READ
CMP #$0D
BNE NMNUA
JMP ASK1A
NMNUA
JSR RCHECK
JSR RDRUB
ASL A
ASL A
ASL A
ASL A
AND #$F0
STA MNUAL
JSR RCHECK
JSR RDRUB
AND #$0F
CLC
ADC MNUAL
STA MNUAL
JMP ASK0A
ASK2A
JSR CLR
LDX #0
QUES1 LDA QUESN1,
JSR OUTPUT
INX
CPX #9
BNE QUES1
LDA MLAL
JSR NUMA
JSR READ
CMP #$0D
BNE NMLAL
JMP ASK2
NMLAL
JSR RCHECK
JSR RDRUB
```

```
ASL A
ASL A
ASL A
ASL A
AND #$F0
STA MLAL
JSR RCHECK
JSR RDRUB
AND #$0F
CLC
ADC MLAL
STA MLAL
JMP ASK2A
ASK2 LDX #0
QUES2 LDA QUESN2,X
JSR OUTPUT
INX
CPX #7
BNE QUES2
LDA MNLAL
JSR NUMA
JSR READ
CMP #$0D
BNE NMNLA
JMP ASK3
NMNLA
JSR RDRUB
ASL A
ASL A
ASL A
ASL A
AND #$F0
STA MNLAL
JSR RCHECK
JSR RDRUB
AND #$0F
CLC
ADC MNLAL
STA MNLAL
JMP ASK2A
ASK3
JSR CLR
LDX #0
QUES3 LDA QUESN3,X
JSR OUTPUT
INX
CPX #9
BNE QUES3
LDA MSE
JSR NUMA
JSR READ
CMP #$0D
BNE NMSE
JMP ASK4
NMSE
JSR RDRUB
```

```
ASL A
ASL A
ASL A
ASL A
AND #$F0
STA MSE
JSR RCHECK
JSR RDRUB
AND #$0F
CLC
ADC MSE
STA MSE
JMP ASK3
ASK4 LDX #0
QUES4 LDA QUESN4,X
JSR OUTPUT
INX
CPX #9
BNE QUES4
RPT4 JSR READ
CMP #$0D
BNE RPT4
ASK5 JSR CLR
LDX #0
QUES5 LDA QUESN5,X
JSR OUTPUT
INX
CPX #9
BNE QUES5
LDA MFR
JSR NUMA
JSR READ
CMP #$0D
BNE NMFR
JMP ASK6
NMFR JSR RCHECK
JSR RDRUB
AND #$0F
STA MFR
JMP ASK5
ASK6 LDX #0
QUES6
LDA QUESN6,X
JSR OUTPUT
INX
CPX #8
BNE QUES6
LDA MNFR
JSR NUMA
JSR READ
CMP #$0D
BNE NMNFR
JMP $C040
NMNFR JSR RCHECK
JSR RDRUB
AND #$0F
```

```
 STA MNFR
 JMP ASK5
DELAY LDY #0
DEL JSR DEBK1
 INY
 CPY #$FF
 BNE DEL
 RTS
QUESN5 .BYT 'FR:  MA
X='
QUESN6 .BYT '    MIN=
'
QUES0 .BYT 'AUTO-CON
TROL VER 1.0'
QUESN0 .BYT 'CONTROL
 CODE='
QUN .BYT 'RESET DATA
=0: RUN=1 '
QUN0A .BYT 'VAL: MAX
='
QU05  BYT '    MIN=00
'
QUESN1 .BYT 'LAL: MA
X='
QUESN2 .BYT '    MIN=
'
QUESN3 .BYT 'BS2: MA
X='
NAM .BYT 'BY MISRA &
 SHYY  ISU'
QUESN4 .BYT '    MIN=
00'
 .END
 *=$50
DMCHK *=*+1
COUNT *=*+1
 MSLAL *=*+1
 LSLAL *=*+1
 MSUAL *=*+1
 LSUAL *=*+1
 AMLAL *=*+1
 ALLAL *=*+1
 AMUAL *=*+1
 ALUAL *=*+1
 *=$00
RUN *=*+1
HOUR *=*+1
MIN *=*+1
SECD *=*+1
DECM *=*+12
UAL *=*+1
LAL *=*+1
BS2 *=*+1
CLS *=*+1
TOTAL *=*+1
FSEC *=*+1
TSEC *=*+1
HEST *=*+2
HEXA *=*+1
DSTR *=*+1
KEYM *=*+1
DIR  *=*+1
MTCON *=*+1
TH *=*+1
TM *=*+1
DDRB *=*+1
 *=$0112
 JMP $D000
 *=$D000
 LDA #$60
 STA MLAL
 LDA #$40
 STA MNLAL
 LDA #$40
 STA MUAL
 LDA #$10
 STA MNUAL
 LDA #$20
 STA MSE
 LDA #$05
 STA MNSE
 LDA #4
 STA FR
 LDA #8
 STA MFR
 LDA #2
 STA MNFR
 LDA #$30
 STA ANG
 LDA #00
 STA CCODE
 LDA #$40
 STA VANG
 LDA #$01
 STA DMCHK
 LDX #0
 JSR CLR
TIT LDA TITL,X
 JSR OUTPUT
 INX
 CPX #20
 BNE TIT
 JSR DELAY
 JSR CLR
 LDX #0
NAME LDA NAM,X
 JSR OUTPUT
 INX
 CPX #20
 BNE NAME
 JSR DELAY
 JSR CLR
 LDX #0
REME LDA REME1,X
 JSR OUTPUT
 INX
 CPX #20
 BNE REME
 LDA #$00
 STA DSTR
 LDA #$03
 STA SR1
 LDA #$4E
 STA CTR1
 LDA #$2?
 STA CTR2
 LDA #0
 STA DDRA
 LDA #$FF
 STA DDRB
 LDA #$C0
 STA ACR
 LDA #$C0
 STA IER
 LDA #$77
 STA IRB
 LDA #$70
 STA DRB
 LDX #0
 LDA #0
RECL STA HOUR,X
 INX
 CPX #21
 BNE RECL
 LDA #$80
 STA DSTR
 LDA #$F0
 STA T1CL
 LDA #$3C
 STA T1CH
 LDA #<IIRQ
 STA IRQV
 LDA #>IIRQ
 STA IRQV+1
 CLI
 LDA #0
 STA COUNT
 STA MSLAL
 STA LSLAL
 STA MSUAL
 STA LSUAL
 STA AMLAL
 STA ALLAL
 STA AMUAL
 STA ALUAL
START
 LDA SECD
 CMP SECD
 BEQ START
```

```
ACCU
 LDA #$EF
 STA ADRA
 LDA ADRB
 EOR #$FF
 BNE DP
 LDA DSTA
DP STA DSTA
 CMP #$01
 BNE DPA
 JMP SETRA
 JMP NOC
DPA
 LDA #$71
 STA DRB
 LDX #0
 JSR SENS
 LDA #$72
 STA DRB
 LDX #2
 JSR SENS
 LDA #$73
 STA DRB
 LDX #4
 JSR SENS
 LDA #$74
 STA DRB
 LDX #6
 JSR SENS
 LDA #$75
 STA DRB
 LDX #8
 JSR SENS
 LDA #$76
 STA DRB
 LDX #10
 JSR SENS
 LDA #$77
 STA DRB
 LDA #$70
 STA DRB
 LDA SECD
 AND #$0F
 CMP #0
 BEQ CONT
 JMP ACCU
CONT
DPS JSR DISPS
CLEN
 JSR DUMP
NOC
 LDA COUNT
 CMP #10
 BEQ AVE
 INC COUNT
 LDA #0
 LDX #0
REP2 STA DECM,X
 INX
 CPX #17
 BNE REP2
RECH
 LDA SECD
 AND #$0F
 CMP #0
 BNE RECHK
 JMP START
CALC
 CLC
 LDA DECM-1
 ADC LSLAL
 STA LSLAL
 BCC LOPL
 INC MSLAL
LOPL CLC
 LDA DECM-2
 ADC MSLAL
 STA MSLAL
 CLC
 LDA DECM-11
 ADC LSUAL
 STA LSUAL
 BCC LOPU
 INC MSUAL
LOPU CLC
 LDA DECM-10
 ADC MSUAL
 STA MSUAL
 RTS
AVE JSR CLR
 LDX #0
AVEA LDA AVE1,X
 JSR OUTPUT
 INX
 CPX #7
 BNE AVEA
 LDA LSLAL
 AND #$F0
 LSR A
 LSR A
 LSR A
 LSR A
 AND #$0F
 STA LSLAL
 LDA MSLAL
 AND #$0F
 ASL A
 ASL A
 ASL A
 ASL A
 ORA LSLAL
 STA LSLAL
 LDA MSLAL
 AND #$F0
 LSR A
 LSR A
 LSR A
 LSR A
 STA MSLAL
 LDA LSUAL
 AND #$F0
 LSR A
 LSR A
 LSR A
 LSR A
 STA LSUAL
 LDA MSUAL
 AND #$0F
 ASL A
 ASL A
 ASL A
 ASL A
 ORA LSUAL
 STA LSUAL
 LDA MSUAL
 AND #$F0
 LSR A
 LSR A
 LSR A
 LSR A
 STA MSUAL
 STA AMUAL
 JSR NUMA
 LDA LSUAL
 STA ALUAL
 JSR NUMA
 LDX #0
AVEB LDA AVE2,X
 JSR OUTPUT
 INX
 CPX #5
 BNE AVEB
 LDA MSLAL
 STA AMLAL
 JSR NUMA
 LDA LSLAL
 STA ALLAL
 JSR NUMA
 LDA #0
 STA COUNT
 STA MSLAL
 STA LSLAL
 STA MSUAL
 STA LSUAL
```

```
  JMP NOC
 DELAY LDY #0
 DEL JSR DEBK1
  INY
  CPY #$FF
  BNE DEL
  RTS

CHKUA
 LDA AMUAL
 BEQ SETUA
 LDA #$99
 STA MUAL
 LDA #$60
 STA MNUAL
 JMP CHKLA
SETUA
 CLC
 LDA ALUAL
 ADC #$20
 STA MUAL
 BCC SETMU
 LDA #$99
 STA MUAL
SETMU
 LDA ALUAL
 CMP #7
 BCC EQ0
 SBC #5
 STA MNUAL
 JMP CHKLA
EQ0 LDA #2
 STA MNUAL
CHKLA
 LDA AMLAL
 BEQ SETLA
 LDA #$99
 STA MLAL
 LDA #$60
 STA MNLAL
 JMP FINISH
SETLA
 CLC
 LDA ALLAL
 ADC #$20
 STA MLAL
 BCC SETML
 LDA #$99
 STA MLAL
SETML
 LDA ALLAL
 CMP #7
 BCC EQ1
 SBC #5
 STA MNLAL
 JMP FINISH
EQ1 LDA #2
 STA MNLAL
FINISH
 JMP $C040
DSP4A .BYT 'BS1='
DSP4B .BYT 'BS2='
DSP3A .BYT 'UAL='
DSP3B .BYT 'LAL='
AVE1 .BYT 'AV UAL='
AVE2 .BYT ',LAL='
TITL .BYT 'DATA READ
 & AVER PGM'
REME1 .BYT '*** DATA
 READING ***'
NAM .BYT 'BY SHYY &
[illegible]
```

We claim:

1. An improved cleaning system for separating lighter material from heavier material in a mixture of particulate materials, the system including an inlet for receiving the mixture, an outlet for discharging heavier material, and a vacuum air-lift means between the inlet and the outlet for separating the lighter material from the heavier material, the air-lift means having a spout for collecting the lighter material and having a first gate movable between a normal closed position for maintaining the vacuum of the air-lift means and a second open position for discharging the lighter material, the improvement comprising:

a second gate in said air-lift spout mounted upstream from the first gate and being movable between a normal open position when the first gate is closed and a closed position when the first gate is open; and a sensor for sensing the quantity of lighter material separated by the air-lift means, the sensor being mounted in the spout downstream from the second gate so that when the second gate is in the open position, the lighter material separated by the air-lift means enters the spout and passes the second gate for sensing by the sensor.

2. The cleaning system of claim 1 wherein the second gate is pivotally mounted in the spout so as to automatically move to the closed position by the vacuum of the air-lift means when the first gate is open.

3. The cleaning system of claim 1 wherein the sensor produces signals corresponding to the quantity of lighter material sensed by the sensor, and the sensor is interfaced with a processing means for receiving and processing the signals for monitoring the cleaning system and for adjusting the extent of separation by the air-lift means to achieve a desired efficiency of the system.

4. The cleaning system of claim 1 further comprising at least one elongated screen for separating undersized material from oversized material, the screen having a feed end and a discharge end, and a screening spout adjacent the discharge end for collecting the undersized material sifted through the screen, a divider plate mounted in the screening spout so as to divide the screening spout into an upstream side and a downstream side, the upstream side collecting the undersized material sifted along the substantial length of the screen and the downstream side collecting the undersized material sifted immediately adjacent the discharge end of the screen, whereby the presence of undersized material in the downstream side of the screening spout indicates that the separation by the screen of the undersized material from the oversized material is incomplete; and another sensor mounted in the downstream side of the screening spout for sensing the quantity of undersized material collected therein.

5. The cleaning system of claim 4 wherein the another sensor produces signals corresponding to the quantity of undersized material sensed by the another sensor and the another sensor is interfaced with a processing means for receiving and processing the signals for monitoring the cleaning system and for adjusting the extent of separation by the screen to achieve a desired efficiency of the system.

6. A method for separating desire material from undesirable material in a mixture of particulate materials, comprising:

introducing the mixture onto a first screen means for separating undersized material from oversized material within the mixture, the screen means having a feed end and a discharge end;

sensing the quantity of undersized material separated by the screen means adjacent the discharge end thereof and generating a signal corresponding to such quantity;

depositing the oversized material into an air-lift means for separating lighter material from heavier materials within the oversized materials;

sensing the quantity of lighter materials separated by the air-lift means and generating a signal corresponding to such quantity;

adjusting the extent of separation by the screen means and the extent of separation by the air-lift means in response to the respective generated signals so as to achieve a desired cleaning efficiency; and sampling the separated lighter materials to determine the quality thereof.

7. The method of claim 6 wherein the adjustments are made by a processing unit which receives and processes the respective signals.

8. The method of claim 6 further comprises dividing the discharge end of the screen means into an upstream side and a downstream side, the sensing of the quantity of undersized materials occurring only on the downstream side of the discharge end of the screen means.

9. The method of claim 6 wherein the sampling further includes opening a first gate and closing a second gate within said air-lift means so as to maintain the vacuum therein, the sample being located between the first and second gates.

10. The method of claim 9 wherein the closing of the second gate is automatic and simultaneous with the opening of the first gate.

11. The method of claim 6 further comprising receiving any of said generated signals with a processing means.

12. The method of claim 11 further comprising presenting a user of the method with official information from said processing means regarding and corresponding to the generated signals.

13. The method of claim 11 further comprising interpreting the generated signals with the processing means and instructing a user how to adjust any of the introduction and separation of material to cause the method to achieve desired separation of undesirable material from desirable material.

14. The method of claim 11 further comprising automatically adjusting with the processing means any of the introduction and separation of material on a continuous, automatic basis to achieve pre-set separation of undesirable material from desirable material.

15. The method of claim 11 further comprising controlling operation of one or more motors in response to the generated signals.

16. A method of separating an undesired portion from a desired portion of a mixture of various size, shape and weight materials, comprising the steps of:

feeding material into a separator means at a first rate of feed; separating at least some of the undesirable portion of the material from the desirable portion of material in the separator means;

sensing the quantity of undesirable material which is separated from the desirable material in the separator means;

adjusting at least one of the set of feed rate of the material and separation of the material to change the separation process; and sampling the separated undesirable portion of materials to determine the quality thereof.

* * * * *